(12) United States Patent
Kim et al.

(10) Patent No.: US 12,222,601 B2
(45) Date of Patent: Feb. 11, 2025

(54) DISPLAY APPARATUS

(71) Applicant: SAMSUNG ELECTRONICS CO., LTD., Suwon-si (KR)

(72) Inventors: Daesik Kim, Suwon-si (KR); Yasuhiro Nishida, Suwon-si (KR); Kyonghyong Kim, Suwon-si (KR); Jongil Kim, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 18/103,933

(22) Filed: Jan. 31, 2023

(65) Prior Publication Data

US 2023/0314874 A1 Oct. 5, 2023

Related U.S. Application Data

(63) Continuation of application No. PCT/KR2023/000484, filed on Jan. 11, 2023.

(30) Foreign Application Priority Data

Apr. 5, 2022 (KR) .................. 10-2022-0042296

(51) Int. Cl.
   *G02F 1/1335* (2006.01)
   *G02F 1/13357* (2006.01)
(52) U.S. Cl.
   CPC .. *G02F 1/133607* (2021.01); *G02F 1/133603* (2013.01); *G02F 1/133605* (2013.01);
   (Continued)

(58) Field of Classification Search
   CPC ......... G02F 1/133607; G02F 1/133602; G02F 1/133603; G02F 1/133605; G02F 1/133614; G02F 1/133608; G02F 1/133617; G02F 2202/36; G02F 2202/38; G02F 1/01791; G02F 1/133611; G02F 1/133606;
   (Continued)

(56) References Cited

U.S. PATENT DOCUMENTS 8,328,395 B2   12/2012   Kato et al.
9,683,715 B2    6/2017   Min
                     (Continued)

FOREIGN PATENT DOCUMENTS

CN    207262146 U  *  4/2018
CN    112909147 A     6/2021
                     (Continued)

*Primary Examiner* — Hoan C Nguyen
(74) *Attorney, Agent, or Firm* — Sughrue Mion, PLLC

(57) ABSTRACT

A display apparatus includes: a liquid crystal panel; and a backlight unit configured to provide light to the liquid crystal panel, wherein the backlight unit includes: a substrate; a light emitting diode provided on the substrate; a quantum dot cover covering the light emitting diode and configured to convert a wavelength of light emitted from the light emitting diode; a refractive cover covering the quantum dot cover, wherein a surface of the refractive cover has a recessed portion that is recessed toward the quantum dot cover and a reflector provided in the recessed portion to be positioned above the quantum dot cover, and wherein a diameter of a lower surface of the reflector is smaller than a diameter of an upper surface of the reflector.

16 Claims, 20 Drawing Sheets

(52) U.S. Cl.
CPC .. *G02F 1/133608* (2013.01); *G02F 1/133614* (2021.01); *G02F 1/133617* (2013.01); *G02F 2202/36* (2013.01)

(58) Field of Classification Search
CPC .............. G02B 6/0229; G02B 19/0014; G02B 19/0061; G02B 19/0095; G02B 19/0028; G02B 19/0071; F21V 5/04; F21V 5/08; F21V 5/10; F21V 7/0066; H01L 33/54; H01L 33/60; H01L 33/58; F21K 9/60
See application file for complete search history.

(56) References Cited

U.S. PATENT DOCUMENTS

| 10,073,210 | B2 | 9/2018 | Jang et al. |
| 2006/0076568 | A1* | 4/2006 | Keller ................ G02B 19/0061 257/E33.072 |
| 2015/0117024 | A1* | 4/2015 | Min ................... G02B 19/0095 362/308 |
| 2015/0137163 | A1 | 5/2015 | Harris |
| 2015/0228869 | A1* | 8/2015 | Yoo ................... G02F 1/133609 362/97.3 |
| 2016/0138778 | A1* | 5/2016 | Jung ................... G02B 19/0061 362/311.01 |
| 2021/0116750 | A1* | 4/2021 | Kim .................. G02F 1/133603 |

FOREIGN PATENT DOCUMENTS

| JP | 2010257693 A | * | 11/2010 | |
| JP | 2014-229629 A | | 12/2014 | |
| JP | 6422636 B2 | | 11/2018 | |
| KR | 10-2006-0031518 A | | 4/2006 | |
| KR | 10-1028304 B1 | | 4/2011 | |
| KR | 20190036611 A | * | 4/2019 | |
| KR | 10-2181945 B1 | | 11/2020 | |
| KR | 10-2020-0137977 A | | 12/2020 | |
| KR | 10-2023-0014508 A | | 1/2023 | |
| TW | 202035157 A | * | 10/2020 | ......... H01L 25/0753 |

* cited by examiner

FIG. 18
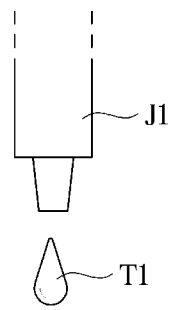
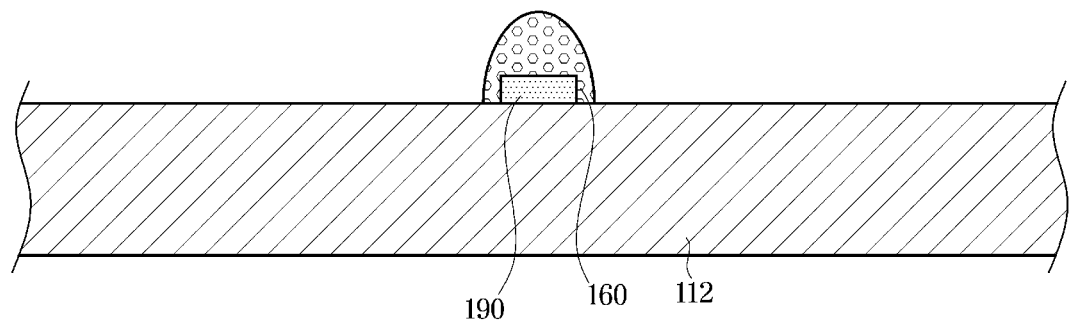

DISPLAY APPARATUS

CROSS-REFERENCE TO RELATED APPLICATION

This application is a by-pass continuation application of International Application No. PCT/KR2023/000484, filed Jan. 11, 2023, which based on and claims priority to Korean Patent Application No. 10-2022-0042296, filed on Apr. 5, 2022, in the Korean Intellectual Property Office, the disclosures of which are incorporated by reference herein in their entireties.

BACKGROUND

1. Field

The disclosure relates to a display apparatus including a backlight unit and a liquid crystal panel.

2. Description of Related Art

In general, a display apparatus is an output apparatus for converting obtained or stored electrical information into visual information and displaying the visual information for users. The display apparatus is used in various fields, such as homes, businesses, etc.

Display apparatuses include a monitor connected with a personal computer, a server computer, etc., a portable terminal (for example, a portable computer, a navigation terminal, a general television, an Internet Protocol television (IPTV), a smart phone, a tablet PC, Personal Digital Assistant (PDA), or a cellular phone), various display apparatuses used for reproducing images such as advertisements or movies in industrial sites, or other various kinds of audio/video systems.

A display device includes a backlight unit (BLU) for providing light to a liquid crystal panel. The backlight unit includes a plurality of point light sources capable of emitting light independently.

SUMMARY

Provided is a display apparatus including a backlight unit having high productivity and low manufacturing cost.

In addition, provided is a display apparatus including a backlight unit capable of reducing production cost by reducing an amount of use of a quantum dot resin.

In addition, provided is a display apparatus including a light source having an optical profile of a great beam angle.

Additional aspects of the disclosure will be set forth in part in the description which follows and, in part, will be apparent from the description, or may be learned by practice of the presented embodiments.

According to an aspect of the disclosure, a display apparatus includes: a liquid crystal panel; and a backlight unit configured to provide light to the liquid crystal panel, wherein the backlight unit includes: a substrate; a light emitting diode provided on the substrate; a quantum dot cover covering the light emitting diode and configured to convert a wavelength of light emitted from the light emitting diode; a refractive cover covering the quantum dot cover, wherein a surface of the refractive cover has a recessed portion that is recessed toward the quantum dot cover and a reflector provided in the recessed portion to be positioned above the quantum dot cover, and wherein a diameter of a lower surface of the reflector is smaller than a diameter of an upper surface of the reflector.

The refractive cover may have a maximum height at a point spaced from a center of the light emitting diode by a certain distance in a horizontal direction.

The refractive cover may be upwardly convex at the maximum height.

The refractive cover may be rotationally symmetric.

The lower surface of the reflector may be upwardly convex.

A diameter of the lower surface of the reflector may be greater than a diameter of a lower surface of the quantum dot cover.

The lower surface of the reflector may be flat, and the lower surface of the reflector may include a glass beads array or a microprism array.

The backlight unit further includes a lower reflector provided on the substrate and including a photo solder resist (PSR).

A horizontal distance from a center of the light emitting diode to an outermost point of the reflector to which a marginal ray passing through the refractive cover may be tangent may be Lr, a vertical distance from the outermost point of the reflector to the lower reflector may be H, and $10° < \tan^{-1}(H/Lr) < 70°$.

The light emitting diode may be mounted on the substrate by a Chip On Board (COB) method.

The light emitting diode may be further configured to emit blue light.

The quantum dot cover may be further configured to convert a portion of the blue light emitted from the light emitting diode into red light and green light.

The quantum dot cover may be formed by dispensing a liquid quantum dot resin and hardening the dispensed liquid quantum dot resin.

The refractive cover may be formed by dispensing a liquid transparent material and hardening the dispensed liquid transparent material.

The reflector may be formed by dispensing a liquid reflective material and hardening the dispensed liquid reflective material.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 18 shows a method for forming a quantum dot cover in a method for manufacturing a light source of a backlight unit according to an embodiment of the disclosure;

DETAILED DESCRIPTION

Figure 1:
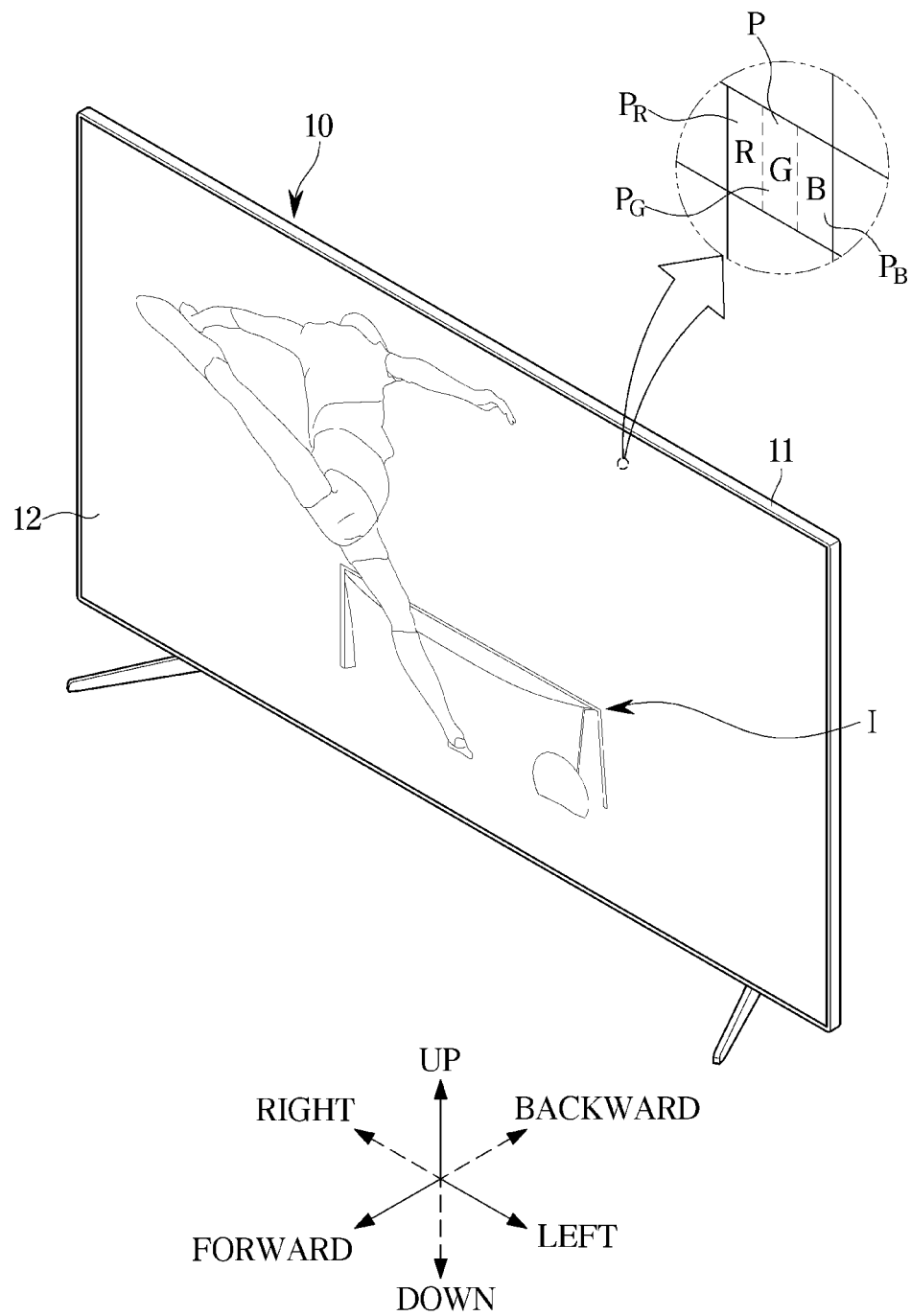
FIG. 1 shows an example of an appearance of a display apparatus according to an embodiment of the disclosure.

Configurations illustrated in the embodiments and the drawings described in the present specification are only the preferred embodiments of the present disclosure, and thus it is to be understood that various modified examples, which may replace the embodiments and the drawings described in the present specification, are possible when filing the present application.

Also, like reference numerals or symbols denoted in the drawings of the present specification represent members or components that perform the substantially same functions.

The terms used in the present specification are used to describe the embodiments of the present disclosure. Accordingly, it should be apparent to those skilled in the art that the following description of exemplary embodiments of the present invention is provided for illustration purpose only and not for the purpose of limiting the invention as defined by the appended claims and their equivalents. It is to be understood that the singular forms "a," "an," and "the" include plural referents unless the context clearly dictates otherwise. It will be understood that when the terms "includes," "comprises," "including," and/or "comprising," when used in this specification, specify the presence of stated features, figures, steps, operations, components, members, or combinations thereof, but do not preclude the presence or addition of one or more other features, figures, steps, operations, components, members, or combinations thereof.

Also, it will be understood that, although the terms including ordinal numbers, such as "first", "second", etc., may be used herein to describe various components, these components should not be limited by these terms. These terms are only used to distinguish one component from another. For example, a first component could be termed a second component, and, similarly, a second component could be termed a first component, without departing from the scope of the present disclosure. As used herein, the term "and/or" includes any and all combinations of one or more of associated listed items. Throughout the disclosure, the expression "at least one of a, b or c" indicates only a, only b, only c, both a and b, both a and c, both b and c, or all of a, b, and c. Hereinafter, embodiments of the disclosure will be described in detail with reference to the accompanying drawings.

FIG. 1 shows an example of an appearance of a display apparatus according to an embodiment of the disclosure. In FIG. 1, a display apparatus 10 may be an apparatus capable of processing image signals received from outside to generate images and visually displaying the images. In the following description, the display apparatus 10 is assumed to be a television (TV), although not limited thereto. However, the display apparatus 10 may be implemented as one of various apparatuses, such as a monitor, a portable multimedia apparatus, a portable communication apparatus, etc. That is, a kind of the display apparatus 10 is not limited as long as the display apparatus 10 is capable of visually displaying images.

Also, the display apparatus 10 may be a large format display (LFD) that is installed in an outdoor space, such as the top of building or a bus stop. The outdoor space is not limited to an open-air space, and the display apparatus 10 according to an embodiment of the disclosure may be installed in any place where many peoples enter, such as a subway station, a shopping mall, a theater, an office, a store, etc., although the place is an indoor space.

The display apparatus 10 may receive content including a video signal and an audio signal from various content sources, and output video and audio corresponding to the video signal and the audio signal. For example, the display apparatus 10 may receive content data through a broadcasting reception antenna or a wired cable, receive content data from a content reproducing apparatus, or receive content data from a content providing server of a content provider.

As shown in FIG. 1, the display apparatus 10 may include a main body 11 and a screen 12 for displaying an image I. The main body 11 may form an appearance of the display apparatus 10, and components for enabling the display apparatus 10 to display an image I or perform various functions may be installed inside the main body 11. The main body 11 shown in FIG. 1 is in the shape of a flat plate, however, a shape of the main body 11 is not limited to the shape shown in FIG. 1. For example, the main body 11 may be in the shape of a curved plate.

The screen 12 may be formed on a front side of the main body 11 and display an image I. For example, the screen 12 may display a still image or a moving image. Also, the screen 12 may display a two-dimensional plane image or a three-dimensional stereoscopic image using a user's binocular disparity. The screen 12 may include a non-emissive panel (for example, a liquid crystal panel) capable of transmitting or blocking light emitted by a backlight unit (BLU), etc.

In the screen 12, a plurality of pixels P may be formed, and the image I displayed on the screen 12 may be formed by light emitted from each of the plurality of pixels P. For example, light emitted from the plurality of pixels P may be combined like mosaic, thereby forming an image I on the screen 12.

Each of the plurality of pixels P may emit light of various brightness and various colors. To emit light of various colors, each of the plurality of pixels P may include a plurality of sub pixels $P_R$, $P_G$, and $P_B$.

The sub pixels $P_R$, $P_G$, and $P_B$ may include a red sub pixel $P_R$ capable of emitting red light, a green sub pixel $P_G$ capable of emitting green light, and a blue sub pixel $P_B$ capable of emitting blue light. For example, the red light may correspond to light of a wavelength range from about 620 nm (nanometer, which is one billionth of a meter) to about 750 nm, the green light may correspond to light of a wavelength range from about 495 nm to about 570 nm, and the blue light may correspond to light of a wavelength range from about 450 nm to about 495 nm.

Each of the plurality of pixels P may emit light of various brightness and various colors by a combination of red light from the red sub pixel $P_R$, green light from the green sub pixel $P_G$, and blue light from the blue sub pixel $P_B$.

Figure 2:
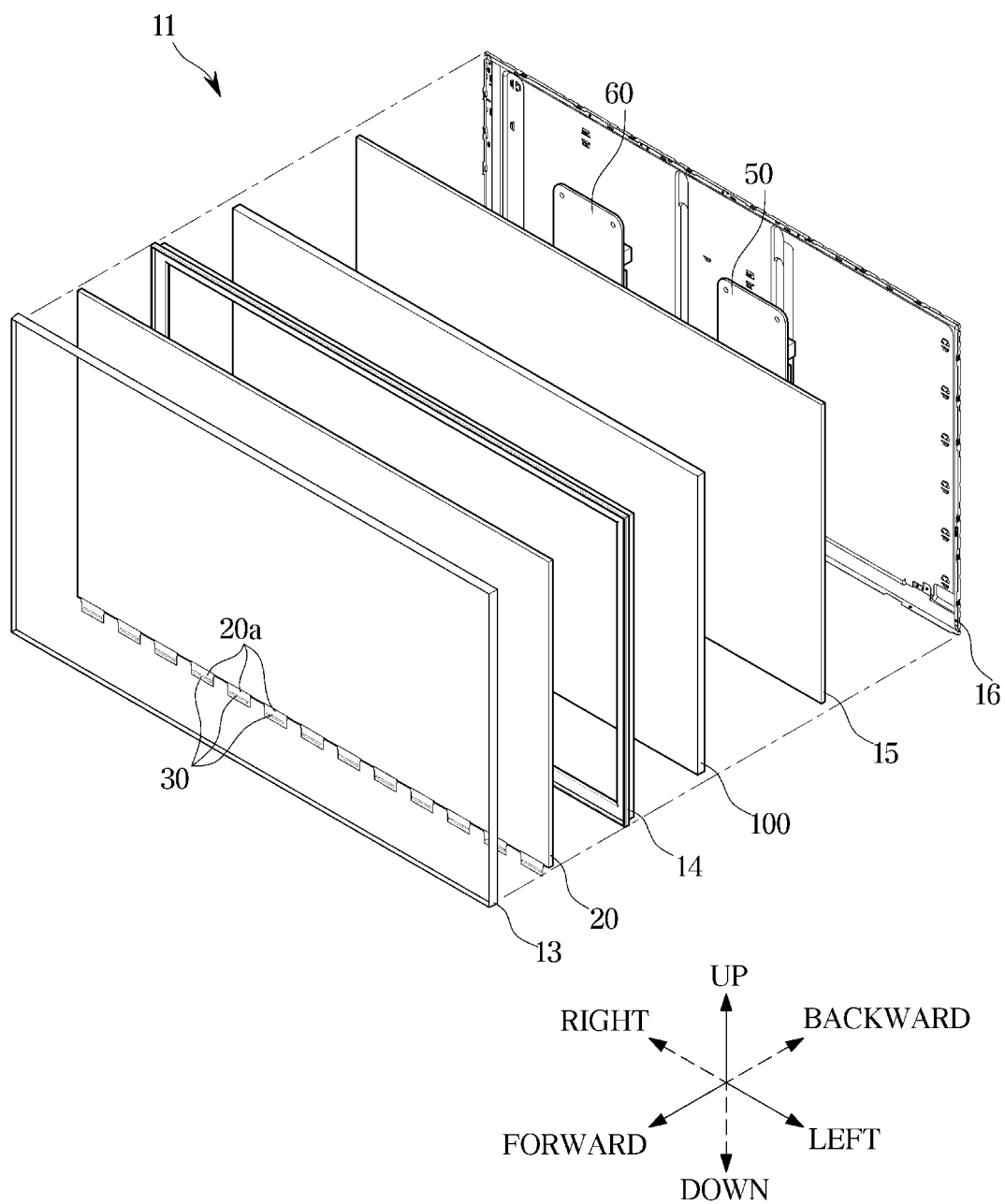
FIG. 2 shows an example of a structure of a display apparatus according to an embodiment of the disclosure.
Figure 3:
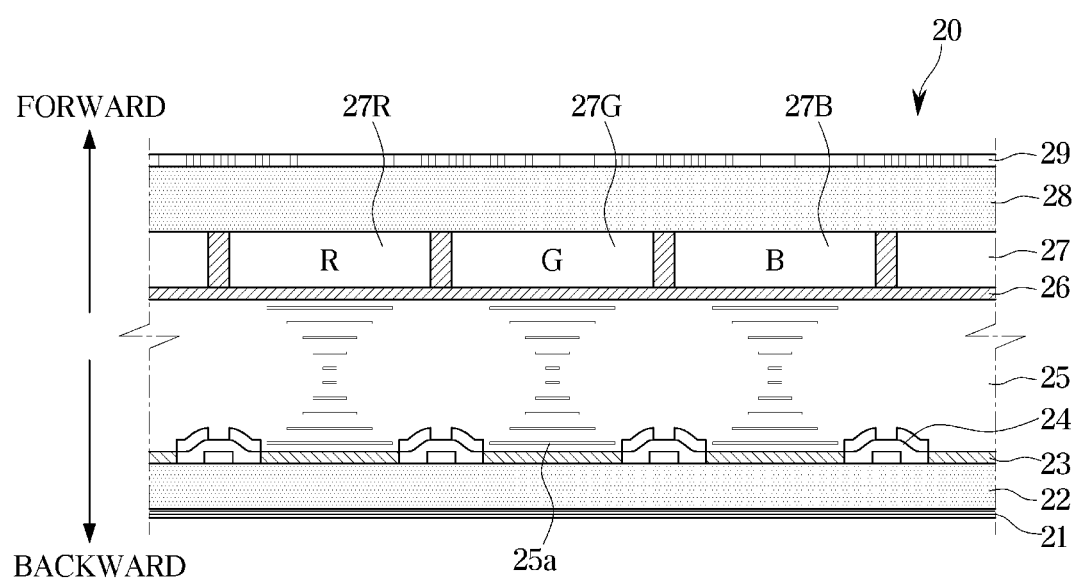
FIG. 3 shows an example of a liquid crystal panel included in a display apparatus according to an embodiment of the disclosure.

FIG. 2 shows an example of a structure of the display apparatus 10 according to an embodiment of the disclosure. FIG. 3 shows an example of a liquid crystal panel included in the display apparatus 10 according to an embodiment of the disclosure.

As shown in FIG. 1, various components for forming an image I on a screen of display apparatus 10 may be provided inside the main body 11.

For example, a backlight unit 100 being a surface light source, a liquid crystal panel 20 for transmitting or blocking light emitted from the backlight unit 100, a control assembly 50 for controlling operations of the backlight unit 100 and the liquid crystal panel 20, and a power assembly 60 for supplying power to the backlight unit 100 and the liquid crystal panel 20 may be provided in the main body 11. Also, the main body 11 may include a bezel 13, a frame middle mold 14, a bottom chassis 15, and a rear cover 16 for supporting the liquid crystal panel 20, the backlight unit 100, the control assembly 50, and the power assembly 60.

The backlight unit 100 may include a point light source for emitting white light. The point light source may include a device for emitting monochromatic light, and a quantum dot cover for converting monochromatic light emitted from the device into white light. For example, the point light source may include a Light Emitting Diode (LED) for emitting blue light, and a quantum dot cover for converting a part of blue light emitted from the light emitting diode into red light and green light. The quantum dot cover may convert a part of blue light into red light and green light by converting a wavelength of the part of the blue light. Thus, blue light emitted from the light emitting diode may be converted into white light by passing through the quantum dot cover.

The backlight unit 100 may refract, reflect, and scatter light emitted from the point light source to convert the light into uniform surface light. As such, the backlight unit 100 may emit uniform surface light toward a front direction by refracting, reflecting, and scattering light emitted from the point light source. The backlight unit 100 will be described in more detail, below.

The liquid crystal panel 20 may be provided in front of the backlight unit 100, and block or transmit light emitted from the backlight unit 100 to form an image I. A front surface of the liquid crystal panel 20 may form the above-described screen S of the display apparatus 10, and the liquid crystal panel 20 may form the plurality of pixels P. Each of the plurality of pixels P of the liquid crystal panel 20 may independently block or transmit light emitted from the backlight unit 100. Also, light transmitted by the plurality of pixels P may form an image I that is displayed on the screen S.

For example, as shown in FIG. 3, the liquid crystal panel 20 may include a first polarizing film 21, a first transparent substrate 22, a pixel electrode 23, a thin film transistor 24, a liquid crystal layer 25, a common electrode 26, a color filter 27, a second transparent substrate 28, and a second polarizing film 29.

The first transparent substrate 22 and the second transparent substrate 28 may fix and support the pixel electrode 23, the thin film transistor 24, the liquid crystal layer 25, the common electrode 26, and the color filter 27. The first transparent substrate 22 and the second transparent substrate 28 may be made of tempered glass or a transparent resin.

The first polarizing film 21 and the second polarizing film 29 may be provided respectively on outer sides of the first transparent substrate 22 and the second transparent substrate 28. The first polarizing film 21 and the second polarizing film 29 may transmit certain polarized light and block (reflect or absorb) the other polarized light. For example, the first polarizing film 21 may transmit polarized light traveling toward a first direction and block (reflect or absorb) the other polarized light. Also, the second polarizing film 29 may transmit polarized light traveling toward a second direction and block (reflect or absorb) the other polarized light, wherein the second direction may be orthogonal to the first direction. Accordingly, polarized light transmitted by the first polarizing film 21 may be not directly transmitted through the second polarizing film 29.

The color filter 27 may be provided on an inner side of the second transparent substrate 28. The color filter 27 may include, for example, a red filter 27R transmitting red light, a green filter 27G transmitting green light, and a blue filter 27B transmitting blue light. Also, the red filter 27R, the green filter 27G, and the blue filter 27B may be arranged side by side. An area occupied by the color filter 27 may correspond to a pixel P described above. An area occupied by the red filter 27R may correspond to a red sub pixel $P_R$, an area occupied by the green filter 27G may correspond to a green sub pixel $P_G$, and an area occupied by the blue filter 27B may correspond to a blue sub pixel $P_B$.

The pixel electrode 23 may be provided on an inner side of the first transparent substrate 22, and the common electrode 26 may be provided on the inner side of the second transparent substrate 28. The pixel electrode 23 and the common electrode 26 may be made of a metal material carrying electricity, and form an electric field for changing an arrangement of liquid crystal molecules 115a configuring the liquid crystal layer 25 which will be described below.

On the inner surface of the first transparent substrate 22, the thin film transistor 24 may be positioned. The thin film transistor 24 may be turned on (closed) or turned off (opened) by image data provided from the panel driver 30. Also, according to turning-on (closing) or turning-off (opening) of the thin film transistor 24, an electric field may be formed or removed between the pixel electrode 23 and the common electrode 26.

The liquid crystal layer 25 may be formed between the pixel electrode 23 and the common electrode 26, and the liquid crystal layer 25 may be filled with the liquid crystal molecules 25a. Liquid crystal is in an intermediate state between a solid (crystal) state and a liquid state. The liquid crystal shows an optical property according to a change in electric field. For example, the direction of the molecular arrangement of liquid crystal changes according to a change in electric field. As a result, the optical property of the liquid crystal layer 25 may change according to the presence or absence of an electric field passing through the liquid crystal layer 25. For example, the liquid crystal layer 25 may rotate a polarizing direction of light with respect to an optical axis according to presence/absence of an electric field. Thereby, a polarizing direction of polarized light passed through the first polarizing film 21 may rotate while the polarized light passes through the liquid crystal layer 25, and then the resultant polarized light may pass through the second polarizing film 29.

At one edge of the liquid crystal panel 20, a cable 20a for transmitting image data to the liquid crystal panel 20, and a Display Driver Integrated circuit (DDI) (hereinafter, referred to as a 'panel driver' 30) for processing digital image data and outputting an analog image signal may be provided.

The cable 20a may electrically connect the control assembly 50 and the power assembly 60 with the panel driver 30, and also electrically connect the panel driver 30 with the liquid crystal panel 20. The cable 20a may include a flexible flat cable or a film cable.

The panel driver 30 may receive image data and power from the control assembly 50 and the power assembly 60 through the cable 20a. Also, the panel driver 30 may provide image data and driving current to the liquid crystal panel 20 through the cable 20a.

Also, the cable 20a and the panel driver 30 may be integrated into one body and implemented as a film cable, a Chip On Film (COF), a Tape Carrier Package (TCP), etc. In other words, the panel driver 30 may be positioned on the cable 20a, although not limited thereto. However, the panel driver 30 may be positioned on the liquid crystal panel 20.

The control assembly 50 may include a control circuit for controlling operations of the liquid crystal panel 20 and the backlight unit 100. For example, the control circuit may process a video signal and/or an audio signal received from an external content source. The control circuit may transmit image data to the liquid crystal panel 20, and transmit dimming data to the backlight unit 100.

The power assembly 60 may include a power circuit for supplying power to the liquid crystal panel 20 and the backlight unit 100. The power circuit may supply power to the control assembly 50, the backlight unit 199, and the liquid crystal panel 20.

The control assembly 50 and the power assembly 60 may be implemented with a printed circuit board and various kinds of circuits mounted on the printed circuit board. For example, the power circuit may include a capacitor, a coil, a resistor device, a processor, and a power circuit board on which the capacitor, the coil, the resistor device, and the processor are mounted. Also, the control circuit may include a memory, a processor, and a control circuit board on which the memory and the processor are mounted.

Figure 4:
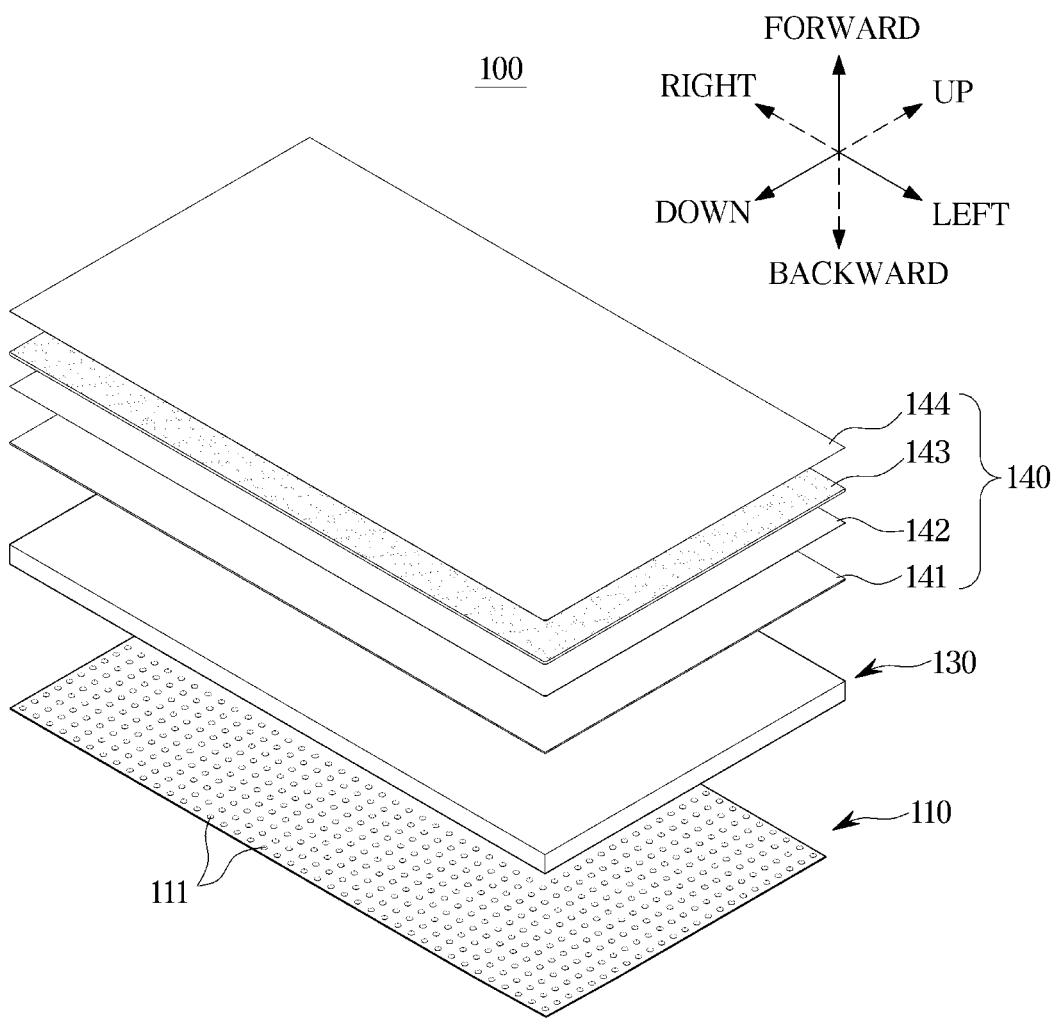
FIG. 4 shows an example of a backlight unit included in a display apparatus according to an embodiment of the disclosure.
Figure 5:
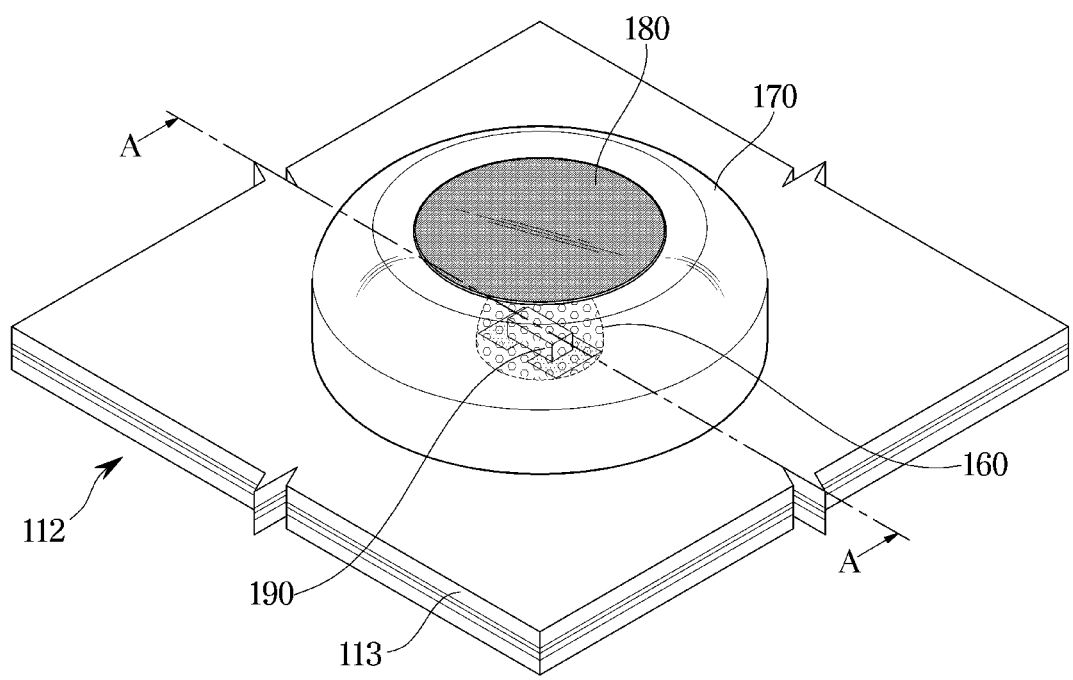
FIG. 5 schematically shows an example of a light source included in a backlight unit according to an embodiment of the disclosure.

FIG. 4 shows an example of a backlight unit included in a display apparatus according to an embodiment of the disclosure. FIG. 5 schematically shows an example of a light source included in a backlight unit according to an embodiment of the disclosure.

As shown in FIG. 4, the backlight unit 100 may include a light source module 110 for generating light, a diffuser plate 130 for uniformly diffusing light, and an optical sheet 140 for improving brightness of exit light. The light source module 110 may include a plurality of light sources 111 for emitting light, and a substrate 112 for supporting and fixing the plurality of light sources 111.

The plurality of light sources 111 may be arranged in a preset pattern to emit light with uniform brightness. The plurality of light sources 111 may be arranged such that distances between each light source and the neighboring light sources are the same.

For example, as shown in FIG. 4, the plurality of light sources 111 may be arranged in regular rows and columns. Accordingly, the plurality of light sources 111 may be arranged such that four neighboring light sources form substantially a square. Also, any one light source may be adjacent to four light sources, and distances between the light source and the four adjacent light sources may be substantially the same.

The plurality of light sources 111 may be arranged such that three neighboring light sources form substantially an equilateral triangle. In this case, one light source may be adjacent to six light sources. Also, distances between the light source and the six adjacent light sources may be substantially the same.

However, an arrangement of the plurality of light sources 111 is not limited to the above-described arrangement, and the plurality of light sources 111 may be arranged in various ways as long as the light sources 111 emit light with uniform brightness. Each light source 111 may adopt a device capable of emitting, upon receiving power, monochromatic light (light having a certain range of wavelength or light having a single peak wavelength, for example, blue light) in various directions.

As shown in FIG. 5, each of the plurality of light sources 111 may include a light emitting diode 190, a quantum dot cover 160, a refractive cover 170, and a reflector 180. The light emitting diode 190 may be attached directly to the substrate 112 by a Chip On Board (COB) method. For example, a light source 111 may include a light emitting diode 190 formed by attaching a light emitting diode chip or a light emitting diode die directly to the substrate 112 without separate packaging.

The light emitting diode 190 may be manufactured as a flip chip type. The flip chip type of the light emitting diode 190 may be formed by welding, upon attaching a light emitting diode being a semiconductor device to the substrate 112, an electrode pattern of a semiconductor device as it is to the substrate 112 without using a middle medium, such as a metal lead (wire) or a Ball Grid Array (BGA). As such, by using neither a metal lead (wire) nor a ball grid array, the light source 111 including the flip chip type of the light emitting diode 190 may be miniaturized.

The light emitting diode 190 may emit monochromatic light. According to an embodiment of the disclosure, the light emitting diode 190 may emit blue light. The blue light emitted from the light emitting diode 190 may be converted into white light by passing through the quantum dot cover 160, although not limited thereto. However, the light emitting diode 190 may emit red light or green light.

The quantum dot cover 160 may cover the light emitting diode 190. The quantum dot cover 160 may prevent or suppress the light emitting diodes 190 from being damaged by a mechanical action from outside and/or by a chemical action.

The quantum dot cover 160 may convert a wavelength of monochromatic light emitted from the light emitting diode 190. The quantum dot cover 160 may convert monochromatic light emitted from the light emitting diode 190 into white light by converting a wavelength of the monochromatic light.

For example, the light emitting diode 190 may emit blue light, and the quantum dot cover 160 may convert a part of the blue light into red light and green light by converting a wavelength of the part of the blue light. Because a part of blue light emitted from the light emitting diode 190 is converted into red light and green light by passing through the quantum dot cover 160, light emitted from the quantum dot cover 160 may become white light. Accordingly, the light source module 110 according to the disclosure may include a light source 111 that emits white light.

According to an embodiment of the disclosure, the quantum dot cover 160 may be formed by dispensing or jetting a liquid quantum dot resin and then hardening the liquid quantum dot resin. The quantum dot cover 160 may be formed by dispensing or jetting and then only hardening without another process. In other words, the quantum dot cover 160 may be considered to be self-formed.

The quantum dot cover 160 may surround an upper surface and four side surfaces of the light emitting diode 190. The quantum dot cover 160 may be formed by dispensing or jetting a liquid quantum dot resin to cover the upper surface and four side surfaces of the light emitting diode 190 and then hardening the liquid quantum dot resin.

The refractive cover 170 may cover the quantum dot cover 160. The refractive cover 170 may prevent or suppress the quantum dot cover 160 from being damaged by a mechanical action from outside and/or by a chemical action.

According to an embodiment of the disclosure, the refractive cover 170 may be in a shape of a dome having a recessed portion at a center. More specifically, the refractive cover 170 may be provided as a rotational symmetry shape of which a lower surface is in a shape of a circle and which has a maximum height h (see e.g., FIG. 7) at a point P spaced a certain distance in a horizontal direction from a center of the lower surface. A portion of the refractive cover 170 around the point P (see e.g., FIG. 7) having the maximum height h may be upwardly convex with respect to a radial direction of the refractive cover 170.

The refractive cover 170 may be made of a silicon or epoxy resin. For example, the refractive cover 170 may be formed by dispensing a molten silicon or epoxy resin in a liquid state on the quantum dot cover 160 through a nozzle, etc. and then hardening the dispensed silicon or epoxy resin.

According to an embodiment of the disclosure, the refractive cover 170 may be formed by dispensing a liquid transparent material from a plurality of points spaced from each other and then hardening the dispensed liquid transparent material. The refractive cover 170 may be formed only by dispensing and hardening without performing another process. In other words, the refractive cover 170 may be considered to be self-formed.

The refractive cover 170 may be optically transparent or translucent. Light emitted from the light emitting diode 190 may be discharged to outside by passing through the quantum dot cover 160 and the refractive cover 170.

At this time, the refractive cover 170 may refract the light, like a lens. For example, light emitted from the light emitting diode 190 and discharged to outside of the quantum dot cover 160 may be dispersed by being refracted by the refractive cover 170.

As such, the refractive cover 170 may cover the quantum dot cover 160 to disperse light discharged to the outside of the quantum dot cover 160.

The substrate 112 may fix the plurality of light sources 111, thus the plurality of light sources 111 does not change their positions. Also, the substrate 112 may supply power required for the light sources 111 to emit light to the light sources 111.

The substrate 112 may fix the plurality of light sources 111. The substrate 112 may be configured as a synthetic resin, tempered glass, or a printed circuit board (PCB) on which a conductive power supply line for supplying power to the light sources 111 is formed.

A lower reflector 113 may be provided on an upper surface of the substrate 112. The lower reflector 113 may include a Photo Solder Resist (PSR) coated on the upper surface of the substrate 112. The lower reflector 113 may reflect light reflected toward the lower reflector 113 from the reflector 180, which will be described below.

A plurality of light emitting diodes 190 may be arranged on the upper surface of the substrate 112 to form an array. Accordingly, a plurality of quantum dot covers 160 may be provided to respectively correspond to the plurality of light emitting diodes 190. Likewise, a plurality of refractive covers 170 may be provided to respectively correspond to the plurality of quantum dot covers 160.

Figure 7:
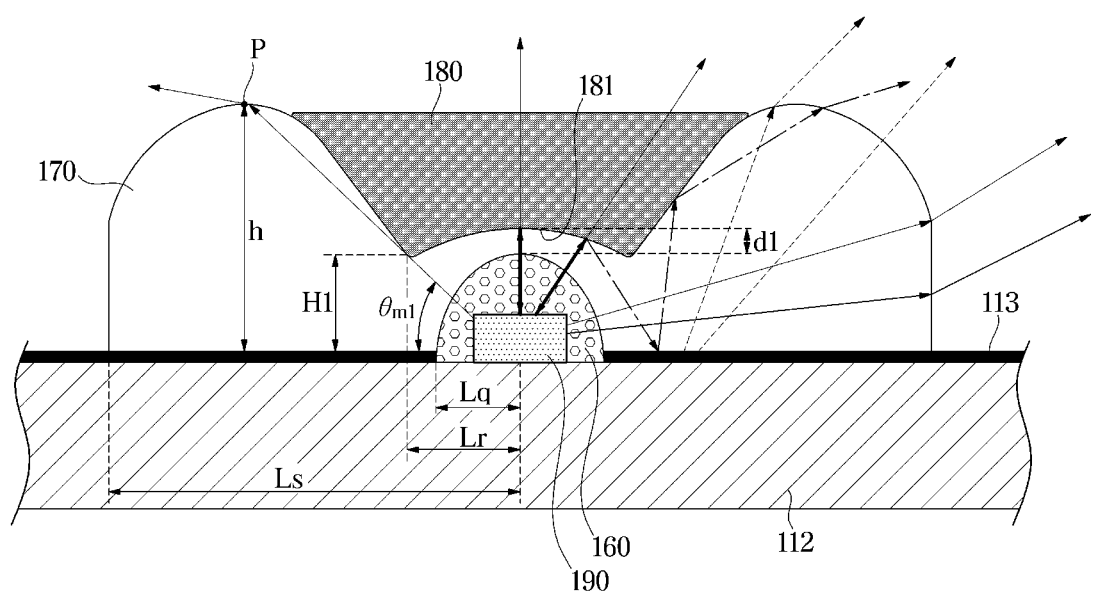
FIG. 7 shows an example of a cross section taken along line A-A of FIG. 5.

According to an embodiment of the disclosure, the reflector 180 may be provided in the recessed portion formed at the center of the refractive cover 170. The recessed portion may be formed at the center of the refractive cover 170 in such a way as to be recessed toward the quantum dot cover 160. That is, as illustrated, e.g., in FIG. 7, the recessed portion's contour of the refractive cover 170 is substantially similar to a contour of the quantum dot cover 160. In FIG. 7, from the reflector 113, the recessed portion's contour of the refractive cover 170 is positioned higher than the contour of the quantum dot cover 160.

The reflector 180 may reflect a part of light emitted from the light emitting diode 190, passed through the quantum dot cover 160 and the refractive cover 170, and then entered the reflector 180. The reflector 180 may be positioned above the quantum dot cover 160. The reflector 180 may be spaced a certain distance from the quantum dot cover 160 in a vertical direction. The distance between the reflector 180 and the quantum dot cover 160 may change according to one or more embodiments of the disclosure. An area of an upper surface or a lower surface of the reflector 180 may be larger than an area of a lower surface of the quantum dot cover 160. A diameter of the upper surface of the reflector 180 may be greater than a diameter of the lower surface. In other words, the diameter of the lower surface of the reflector 180 may be smaller than the diameter of the upper surface. In one embodiment, the reflector 180 may be formed by dispensing a liquid reflective material in the recessed portion of the refractive cover 170 and then hardening the dispensed liquid reflective material. Accordingly, a shape of the reflector 180 may be defined by a shape of the recessed portion of the refractive cover 170. According to one or more embodiments of the disclosure, the shape of the recessed portion of the refractive cover 170 may change to change the shape of the reflector 180 within a certain range.

According to an embodiment of the disclosure, unlike FIG. 4, a substrate extending in one direction to have a bar shape may be provided. In this case, a plurality of light emitting diodes may be arranged at intervals in the extension direction of the substrate to form an array. A plurality of substrates each having a bar shape may be provided. The plurality of substrates may be spaced from each other along a direction that is perpendicular to the extension direction of the substrates. For example, the substrates each having the bar shape may extend along the horizontal direction, while being spaced from each other along the vertical direction.

The diffuser plate 130 may be provided in front of the light source module 110. The diffuser plate 130 may uniformly disperse light emitted from the light sources 111 of the light source module 110.

The diffuser plate 130 may diffuse light emitted from the plurality of light sources 111 within the diffuser plate 130 to reduce brightness non-uniformity caused by the plurality of light sources 111. In other words, the diffuser plate 130 may emit relatively uniform light from a front surface by diffusing non-uniform light emitted from the plurality of light sources 111.

The optical sheet 140 may include various sheets for improving brightness and uniformity of brightness. For example, the optical sheet 140 may include a light conversion sheet 141, a diffuser sheet 142, a prism sheet 143, and a reflective polarizing sheet 144.

However, the optical sheet 140 is not limited to the sheets or films shown in FIG. 4, and may include various other sheets or films such as a protective sheet.

Figure 6:
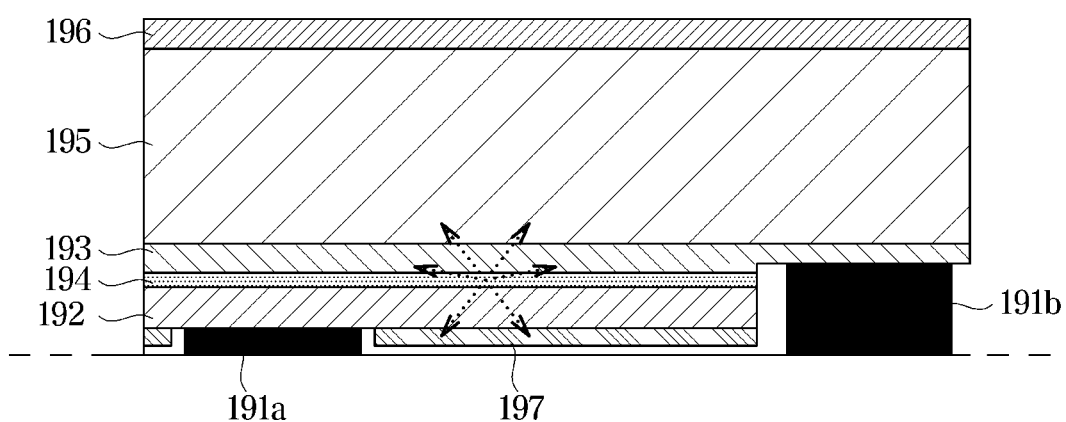
FIG. 6 shows an example of a light emitting diode included in a backlight unit according to an embodiment of the disclosure.

FIG. 6 shows an example of a light emitting diode included in a backlight unit according to an embodiment of the disclosure. In FIG. 6, the light emitting diode 190 may include a transparent substrate 195, an n-type semiconductor layer 193, and a p-type semiconductor layer 192. Also, a multi quantum wells layer 194 may be formed between the n-type semiconductor layer 193 and the p-type semiconductor layer 192.

The transparent substrate 195 may be a base of a pn junction capable of emitting light. The transparent substrate 195 may include, for example, sapphire ($Al_2O_3$) having a crystal structure that is similar to those of the n-type semiconductor layer 193 and the p-type semiconductor layer 192.

A pn junction may be implemented by connecting the n-type semiconductor layer 193 with the p-type semiconductor layer 192. A depletion region may be formed between the n-type semiconductor layer 193 and the p-type semiconductor layer 192. In the depletion region, electrons of the n-type semiconductor layer 193 may be recombined with holes of the p-type semiconductor layer 192. By the recombination of the electrons with the holes, light may be emitted.

The n-type semiconductor layer 193 may include, for example, n-type gallium nitride (GaN). The p-type semiconductor layer 192 may also include, for example, p-type GaN. An energy band gap of GaN may be 3.4 electronvolt (eV) capable of emitting light having a wavelength that is shorter than about 400 nm. Accordingly, in the junction of the n-type semiconductor layer 193 and the p-type semiconductor layer 192, deep blue light or ultraviolet light may be emitted.

The n-type semiconductor layer 193 and the p-type semiconductor layer 192 are not limited to gallium nitride, and may be formed with various semiconductor materials according to desired light.

A first electrode 191*a* of the light emitting diode 190 may be in electrical contact with the p-type semiconductor layer 192, and the second electrode 191*b* may be in electrical contact with the n-type semiconductor layer 193. The first electrode 191*a* and the second electrode 191*b* may function as electrodes, as well as functioning as reflectors for reflecting light.

According to application of a voltage to the light emitting diode 190, holes may be supplied to the p-type semiconductor layer 192 through the first electrode 191*a*, and electrons may be supplied to the n-type semiconductor layer 193 through the second electrode 191*b*. The electrons and holes may be recombined in the depletion region formed between the p-type semiconductor layer 192 and the n-type semiconductor layer 193. At this time, during the recombination of the electrons and holes, energy (for example, kinetic energy and potential energy) of the electrons and holes may be converted into optical energy. In other words, according to recombination of electrons and holes, light may be emitted.

At this time, an energy band gap of the multi quantum wells layer 194 may be smaller than an energy band gap of the p-type semiconductor layer 192 and/or the n-type semiconductor layer 193. Accordingly, the holes and electrons may be captured by the multi quantum wells layer 194.

The holes and electrons captured by the multi quantum wells layer 194 may be easily recombined in the multi quantum wells layer 194. Accordingly, photogeneration efficiency of the light emitting diode 190 may be improved.

The multi quantum wells layer 194 may emit light having a wavelength corresponding to the energy band gap of the multi quantum wells layer 194. For example, the multi quantum wells layer 194 may emit blue light having a wavelength range from 420 nm to 480 nm. As such, the multi quantum wells layer 194 may correspond to a light-emitting layer for emitting blue light.

Light generated by recombination of electrons and holes may be emitted in all directions, not in a specific direction, as shown in FIG. 6. However, in a case of light emitted from a surface such as the multi quantum wells layer 194, light emitted in a direction that is perpendicular to the light-emitting surface may have greatest intensity and light emitted in a direction that is parallel to the light-emitting surface may have smallest intensity.

A first reflector 196 may be provided on an outer side (an upper side) of the transparent substrate 195 in FIG. 6. That is, the first reflector 196 may be positioned above the multi quantum wells layer 194. Also, a second reflector 197 may be provided on an outer side (a lower side of the p-type semiconductor layer 192 in FIG. 6 of the p-type semiconductor layer 192. As such, the transparent substrate 195, the n-type semiconductor layer 193, the multi quantum wells layer 194, and the p-type semiconductor layer 192 may be positioned between the first reflector 196 and the second reflector 197.

Each of the first reflector 196 and the second reflector 197 may reflect a part of incident light, and transmit the other part of the incident light. For example, the first reflector 196 and the second reflector 197 may reflect light having a wavelength included in a certain wavelength range, and transmit light having a wavelength deviating from the certain wavelength range. For example, the first reflector 196 and the second reflector 197 may reflect blue light having a wavelength range from 420 nm to 480 nm, emitted from the multi quantum wells layer 194.

Also, the first reflector 196 and the second reflector 197 may reflect incident light having a certain incident angle, and transmit light deviating from the certain incident angle. As such, each of the first reflector 196 and the second reflector 197 may be a Distributed Bragg Reflector (DBR) layer formed by stacking materials having different refractive indexes to have different reflectance according to incident angles.

For example, the first reflector 196 may reflect incident light with a small incident angle, and transmit incident light with a great incident angle. Also, the second reflector 197 may reflect or transmit incident light with a small incident angle, and reflect incident light with a great incident angle. The incident light may be blue light having a wavelength from 420 nm to 480 nm.

FIG. 7 shows an example of a cross section taken along line A-A of FIG. 5. In FIG. 7, a part of blue light emitted from the light emitting diode 190 may be converted into red light and green light by passing the quantum dot cover 160.

However, although blue light emitted from the light emitting diode 190 passes through the quantum dot cover 160, intensity of the blue light may be still greater than intensity of the converted red light and green light. In this case, because the blue light, red light, and green light have different intensity, light passed through the quantum dot cover 160 may not become white light.

In a relevant technique of using a quantum dot resin to obtain white light from monochromatic light emitted from a light emitting diode, a relatively large amount of a quantum dot resin has been used. The reason may be because a large amount of a quantum dot resin is required to form a quantum dot layer having a sufficient thickness.

According to an embodiment of the disclosure, a part of light passed through the quantum dot cover 160 and then emitted to the outside of the quantum dot cover 160 may be reflected backward by the reflector 180, and the part of the light reflected backward may be again reflected forward by the lower reflector 113. In other words, light emitted from the light emitting diode 190 may be regenerated by the reflector 180 and the lower reflector 113. Through the regeneration process, light emitted from the light emitting diode 190 may pass through the quantum dot cover 160 several times. As light passes through the quantum dot cover 160 several times, intensity of blue light may decrease relatively, while intensity of red light and green light may increase. Accordingly, deviations in intensity between blue light, red light, and green light may be reduced. By reducing deviations in intensity between blue light, red light, and green light, desired white light may be obtained. Also, because the quantum dot cover 160 is formed by dispensing a liquid quantum dot resin on a minimum area to cap the light emitting diode 190, an amount of use of a quantum dot resin may be significantly reduced compared to the relevant technique.

According to an embodiment of the disclosure, a lower surface 181 of the reflector 180 may have an upwardly convex shape. The reflector 180 may be formed by dispensing a liquid reflective material on the refractive cover 170 and then hardening the dispensed liquid reflective material. The liquid reflective material may include, for example, silicon dioxide ($SiO_2$) or silver (Ag).

According to an embodiment of the disclosure, for the lower surface 181 of the reflector 180 to have the upwardly convex shape, the recessed portion provided at the center of the refractive cover 170 may have an upwardly convex shape at a center portion. That is, the recessed portion may be more recessed toward the substrate 112 than the point P having the maximum height h in the refractive cover 170, and the center portion of the recessed portion may have an upwardly convex shape. In one embodiment, an upper surface of the reflector 180 may be flat. That is, the upper surface of the reflector 180 may be a circular flat surface.

A linear distance between the center portion of the lower surface 181 of the reflector 180 and a center portion of an upper surface of the quantum dot cover 160 may be d1. By changing a distance between the center portion of the lower surface 181 of the reflector 180 and the center portion of the upper surface of the quantum dot cover 160, a beam angle profile of the light source 111 may change, which will be described below. More specifically, a short distance between the lower surface 181 of the reflector 180 and the upper surface of the quantum dot cover 160 may increase a beam angle of the light source 111. In contrast, a long distance between the lower surface 181 of the reflector 180 and the upper surface of the quantum dot cover 160 may decrease a beam angle of the light source 111.

Hereinafter, a radius of the lower surface of the quantum dot cover 160 may be referred to as Lq. A horizontal distance from a center of the light emitting diode 190 to an outermost point of the reflector 180 to which a marginal ray passing through the refractive cover 170 is tangent may be referred to as Lr. A vertical distance between the outermost point of the reflector 180 to which a marginal ray is tangent and the lower reflector 113 may be referred to as H1. A radius of a lower surface of the refractive cover 170 may be referred to as Ls. Also, an angle between the marginal ray and the lower reflector 113 may be referred to as $\theta_{m1}$. $\theta_{m1}$ may be expressed as $\theta_{m1}=\tan^{-1}(H1/Lr)$ According to an embodiment of the disclosure, the refractive cover 170 and the reflector 180 may be formed such that $10°<\theta_{m1}<70°$. For the light source 111 to obtain an optical profile having a great beam angle, $10°<\theta_{m1}<70°$.

Also, for the reflector 180 to reflect light emitted upward from the quantum dot cover 160, Lr may be greater than Lq (Lr>Lq). By the structure, light emitted with a greater angle than $\theta_{m1}$ from the quantum dot cover 160 may be reflected backward by the reflector 180, and the light reflected by the reflector 180 may be again reflected forward by the lower reflector 113.

Also, the diameter of the lower surface 181 of the reflector 180 may be greater than the diameter of the lower surface of the quantum dot cover 160. By the structure, the reflector 180 may reflect light emitted upward from the quantum dot cover 160, backward, at the lower surface.

Figure 8:
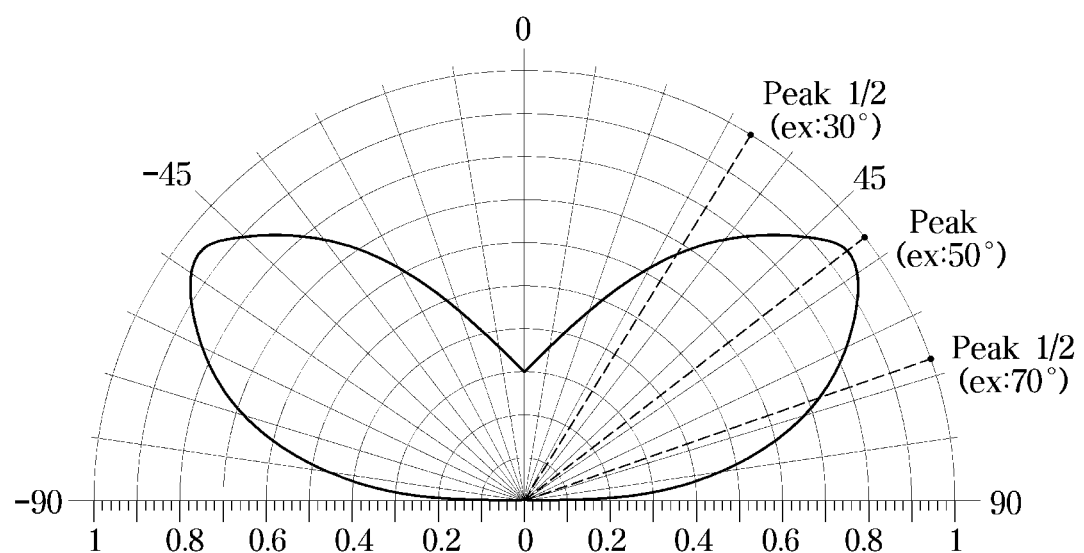
FIG. 8 shows an example of an optical profile emitted from a light source of a backlight unit according to an embodiment of the disclosure.

FIG. 8 shows an example of an optical profile emitted from a light source according to an embodiment of the disclosure. In FIG. 8, the light source 111 according to an embodiment of the disclosure may have an optical profile being substantially in a shape of a bat wing. In other words, the light source 111 may have an optical profile of a great beam angle. Because the reflector 180 is provided above the light emitting diode 190 and the quantum dot cover 160, light emitted upward from the light emitting diode 190 may be reflected downward by the reflector 180, and the light reflected downward may be again reflected by the lower reflector 113. Thereby, the light may exit the refractive cover 170. Through the above-described process, light exited the refractive cover 170 may have an optical profile of a great beam angle.

As illustrated in FIG. 8, the light emitting diode 190 may have an optical profile being substantially in a shape of a bat wing. The optical profile being substantially in the shape of the bat wing may be an optical profile in which intensity of light emitted in an oblique direction (for example, a direction having an angle range (peak ½) of about 30 degrees to about 70 degrees from a vertical axis being perpendicular to the substrate 112) from the light source 111 is greater than intensity of light emitted in a direction being perpendicular to the substrate 112 from the light source 111.

The optical profile shown in FIG. 8 may be an example of an optical profile of the light source 111, and the light source 111 may have an optical profile that is similar to the optical profile of FIG. 8, according to one or more embodiments of the disclosure.

Due to the light source 111 having the optical profile being in the shape of the bat wing, a number of the light emitting diodes 190 included in the display apparatus 10 may be reduced.

To improve image quality of the display apparatus 10, the backlight unit 100 may need to emit surface light having uniform brightness. For example, according to a reduction of the number of light emitting diodes being point light sources, a deviation between brightness of an area where the light emitting diodes exist and brightness of an area (an area between light emitting diodes) where no light emitting diode exists may increase. In other words, according to a reduction of the number of light emitting diodes being point light sources, brightness uniformity of surface light emitted from the backlight unit 100 may deteriorate.

In this case, by using the light source 111 having the optical profile being in the shape of the bat wing, a deviation between brightness of an area where each light source 111 exists and brightness of an area between two neighboring light sources may be reduced. Accordingly, the number of the light emitting diodes 190 may be reduced.

Furthermore, in the display apparatus 10 having a small thickness, an optical distance (OD) by which light emitted from light emitting diodes being point light sources is diffused to surface light may be short. Accordingly, brightness uniformity of surface light emitted from the backlight unit 100 may deteriorate. To maintain brightness uniformity, the number of light emitting diodes may increase.

By including the light emitting diode 190, the quantum dot cover 160, the refractive cover 170, and the reflector 180, the light source 111 may have an optical profile being in a shape of a bat wing, and because the light source 111 has an optical profile being in a shape of a bat wing, an increase of the number of the light sources 111 may be reduced.

Figure 9:
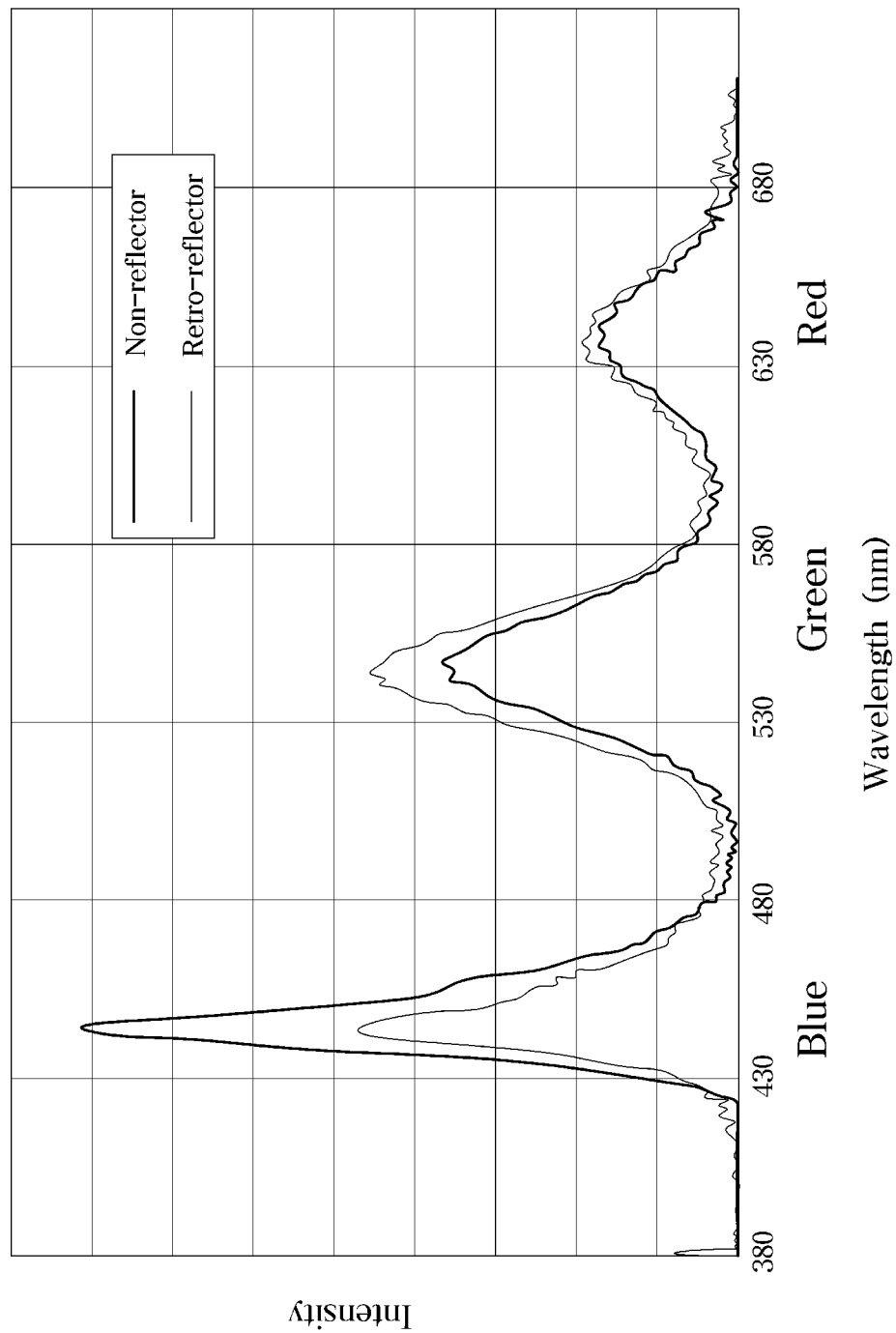
FIG. 9 shows emission spectrums according to presence or absence of a reflector in a light source of a backlight unit according to an embodiment of the disclosure.

FIG. 9 shows emission spectrums according to presence or absence of a reflector in a light source of a backlight unit according to an embodiment of the disclosure. In FIG. 9, the light source 111 according to an embodiment of the disclosure may have a different characteristic of an emission spectrum by including a reflector.

More specifically, in a case in which the light source 111 includes no reflector 180, intensity of blue light in light emitted from the light source 111 may be relatively greater than intensity of red light and green light in the light. Because the intensity of the blue light is greater than the intensity of the green light and the intensity of the green light is greater than the intensity of the red light, imbalance between the blue light, the green light, and the red light may be relatively great. Due to such imbalance, the light source may not emit white light. To overcome the imbalance, a relatively large amount of a quantum dot resin may be required.

The light source 111 according to an embodiment of the disclosure may achieve balance between blue light, green light, and red light by including the reflector 180. Specifically, intensity of green light may become similar to intensity of blue light. Also, a difference between intensity of blue light and intensity of red light may be reduced, and likewise, a difference between intensity of green light and intensity of red light may be reduced. As such, because differences in intensity between blue light, green light, and red light are reduced, the light source 111 may emit white light with a relatively small amount of a quantum dot resin. That is, an amount of use of a quantum dot resin having high cost may be reduced. Accordingly, production cost of the light source 111 may be reduced, and furthermore, production cost of the display apparatus 10 may also be reduced.

Figure 10:
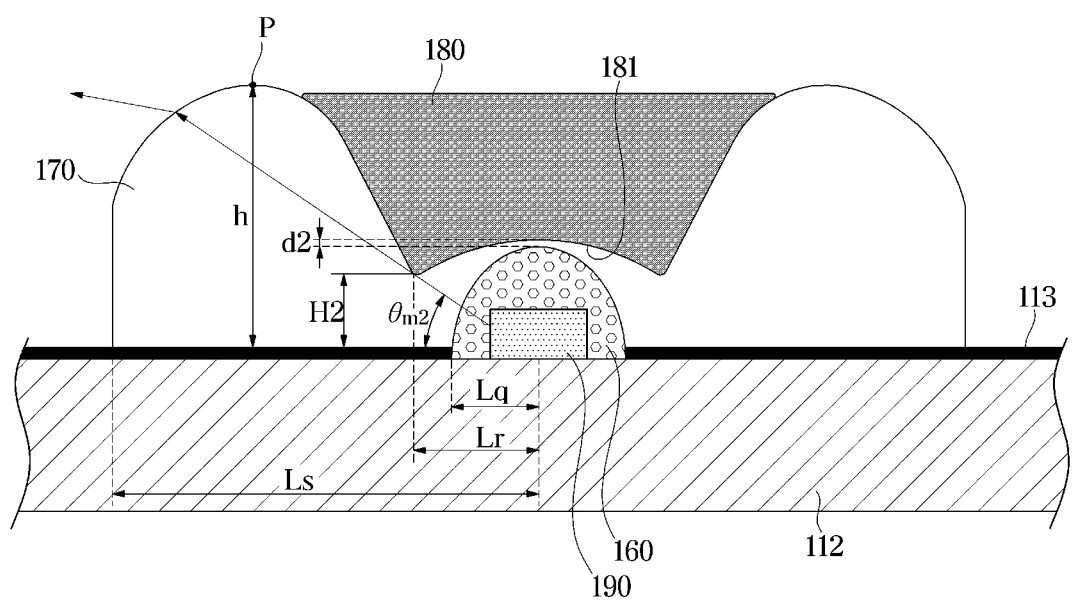
FIG. 10 shows another example of a cross section taken along line A-A of FIG. 5.

FIG. 10 shows another example of a cross section taken along line A-A of FIG. 5. In FIG. 10, in the light source 111 according to an embodiment of the disclosure, a distance between the center of the lower surface 181 of the reflector 180 and a center of the upper surface of the quantum dot cover 160 may be d2. d2 may be smaller than d1 shown in FIG. 7. That is, d2<d1 may be satisfied. A vertical distance H2 between the reflector 180 to which a marginal ray is tangent and the lower reflector 113 may be smaller than H1. That is, H2<H1 may be satisfied.

As shown in FIG. 10, as a distance between the reflector 180 and the quantum dot cover 160 is shortened, an angle $\theta_{m2}$ between the reflector 113 and a marginal ray passing through the refractive cover 170 from a center of the light emitting diode 190 may be reduced. That is, in a case in which d2<d1, $\theta_{m2}<\theta_{m1}$. At a small angle $\theta_{m2}$, a beam angle of the light source 111 may be greater than at the angle $\theta_{m1}$. That is, in the case in which a distance between the reflector 180 and the quantum dot cover 160 is short, an optical profile of a relatively great beam angle may be obtained.

Although d2 is smaller than d1, $10°<\theta_{m2}<70°$ may be satisfied. That is, $10°<\tan^{-1}(H2/Lr)<70°$ may be satisfied.

As such, by adjusting the distance between the lower surface 181 of the reflector 180 and the quantum dot cover 160, a beam angle of the light source 111 may be adjusted.

Figure 11:
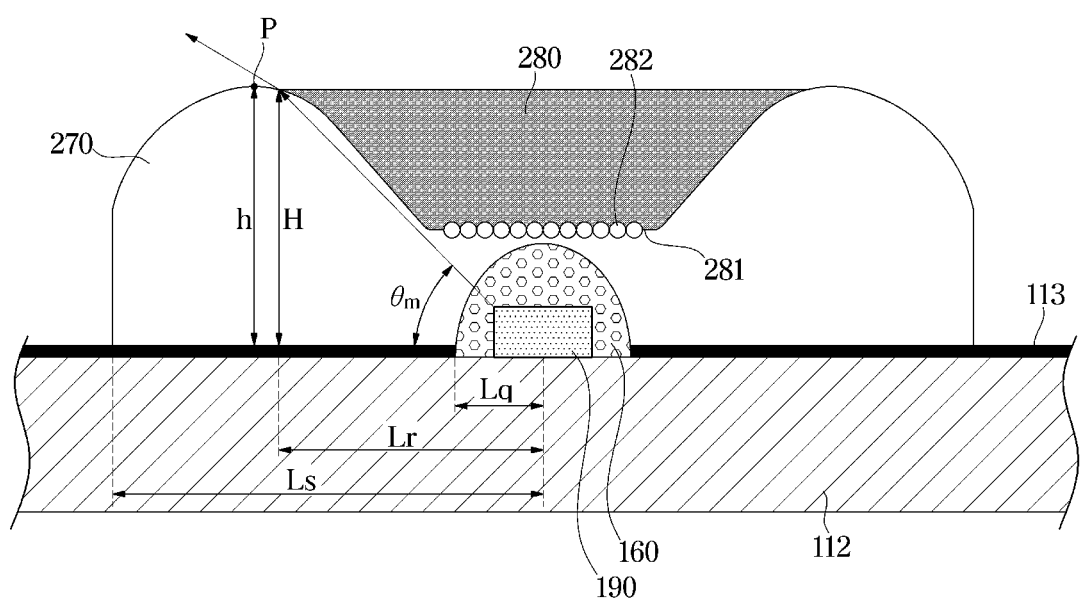
FIG. 11 shows another example of a cross section taken along line A-A of FIG. 5.
Figure 12:
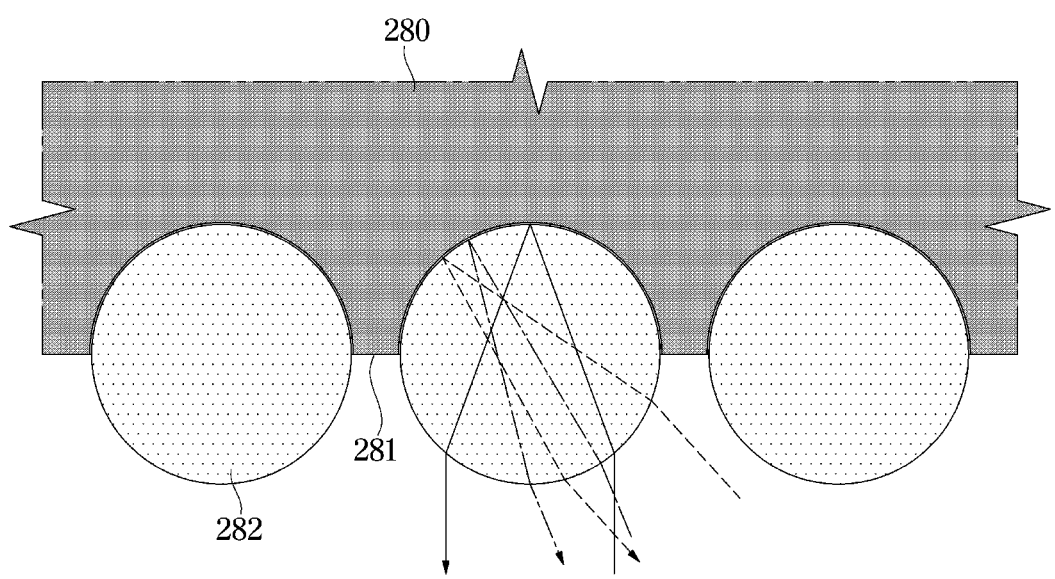
FIG. 12 shows light paths in a lower surface of a reflector shown in FIG. 11.

FIG. 11 shows another example of a cross section taken along line A-A of FIG. 5. FIG. 12 shows light paths in a lower surface of a reflector shown in FIG. 11. In FIGS. 11 and 12, in the light sources 111 according to an embodiment of the disclosure, a glass beads array 282 may be provided on a lower surface 281 of a reflector 280. The lower surface 281 of the reflector 280 may be flat. The lower surface 281 of the reflector 280 may be a circular flat surface. A center portion of a refractive cover 270 may be recessed to correspond to the reflector 280. A vertical distance between the lower reflector 113 and the reflector 280 to which a marginal ray is tangent may be H (H>H1). According to an embodiment of the disclosure, $10°<\tan^{-1}(H/Lr)<70°$ may be satisfied. That is, $10°<\theta_m<70°$ may be satisfied.

In FIG. 11, a diameter of the lower surface 281 of the reflector 280 may be greater than the diameter of the lower surface of the quantum dot cover 160. By the structure, the reflector 280 may reflect light emitted upward from the quantum dot cover 160, backward, at the lower surface 281.

In FIG. 12, the light source 111 according to an embodiment of the disclosure may include the glass beads array 282 as a retro-reflector on the lower surface 281 of the reflector 280. According to a characteristic of the retro-reflector, light entered the glass beads array 282 may be reflected with the same exit angle as an incident angle. The light source 111 according to an embodiment of the disclosure may reflect light entered the reflector 280 from the light emitting diode 190 via the quantum dot cover 160 to the lower reflector 113 by including the glass beads array 282 on the lower surface 281 of the reflector 280. As described above, light reflected to the lower reflector 113 may be again reflected forward by the lower reflector 113 and, accordingly, the light source 111 may obtain an optical profile of a great beam angle.

Figure 13:
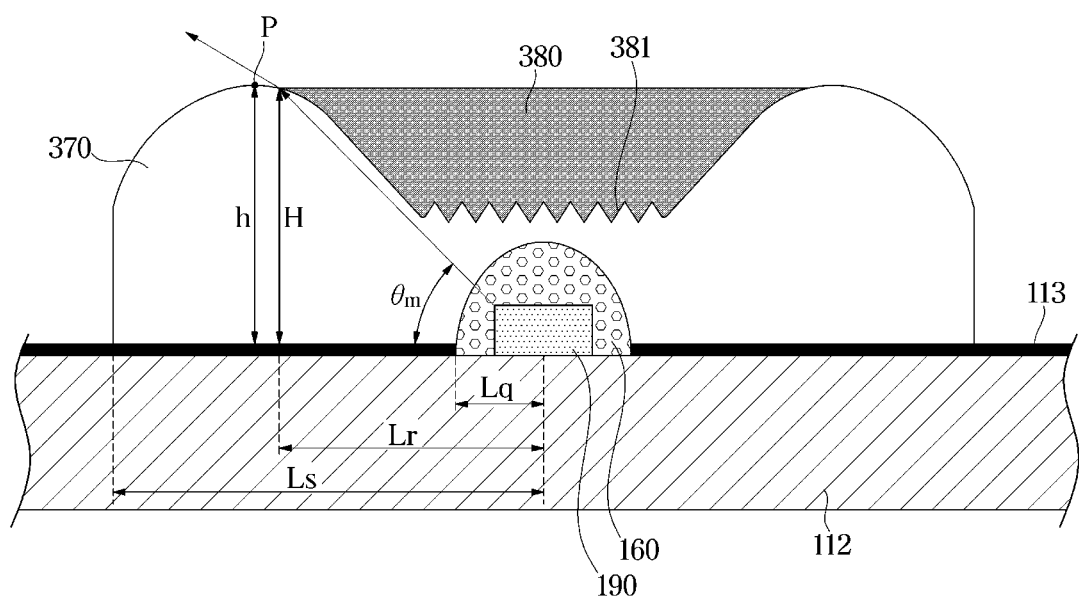
FIG. 13 shows another example of a cross section taken along line A-A of FIG. 5.
Figure 14:
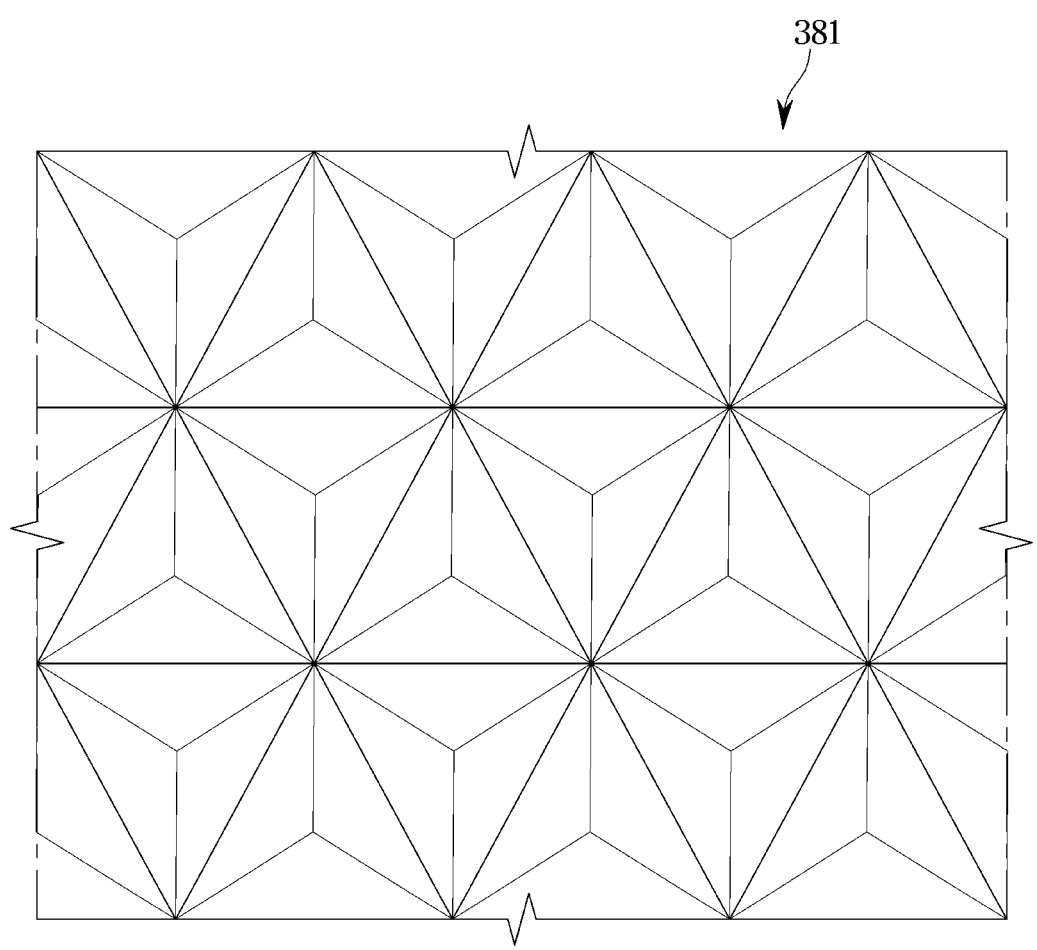
FIG. 14 shows a microprism array provided in a lower surface of a reflector shown in FIG. 13.
Figure 15:
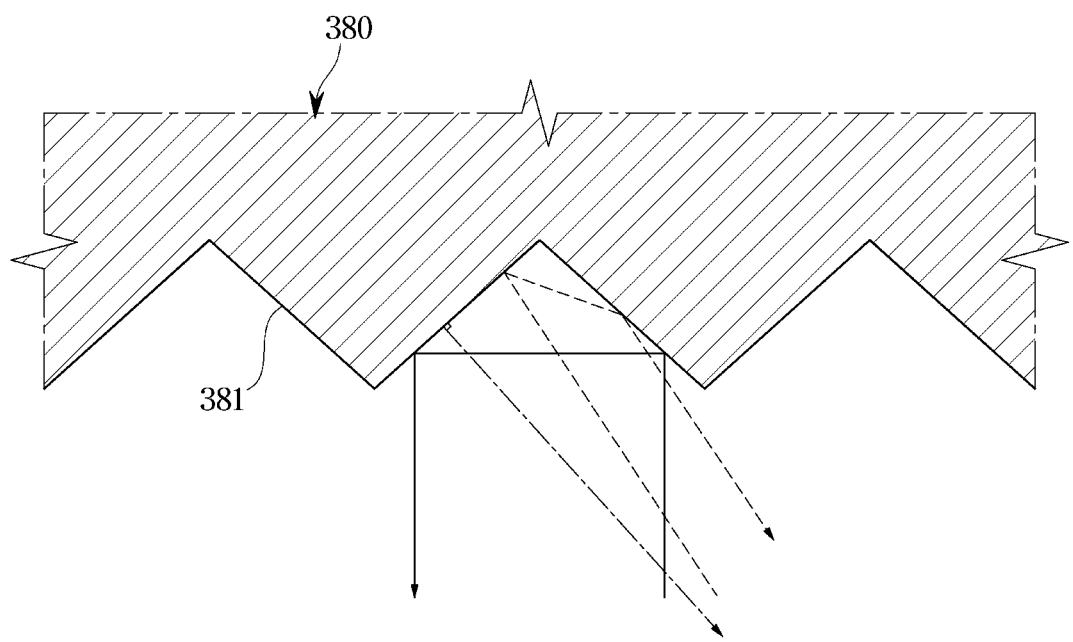
FIG. 15 shows light paths in the lower surface of the reflector shown in FIG. 13.

FIG. 13 shows another example of a cross section taken along line A-A of FIG. 5. FIG. 14 shows a microprism array provided in a lower surface of a reflector shown in FIG. 13. FIG. 15 schematically shows light paths in the lower surface of the reflector shown in FIG. 13.

In FIGS. 13 and 14, in the light source 111 according to an embodiment of the disclosure, a microprism array 381 may be provided on a lower surface of a reflector 380. The lower surface of the reflector 380 may be flat. The lower surface of the reflector 380 may be a circular flat surface. A center portion of a refractive cover 370 may be recessed to correspond to the reflector 380. A vertical distance between the lower reflector 113 and the reflector 380 to which a marginal ray is tangent may be H. H>H1. The microprism array 381 may include a regular tetrahedral array.

In FIG. 13, a diameter of the lower surface of the reflector 380 may be greater than the diameter of the lower surface of the quantum dot cover 160. By the structure, the reflector 380 may reflect light emitted upward from the quantum dot cover 160, backward, at the lower surface.

In FIGS. 14 and 15, the light source 111 according to an embodiment of the disclosure may include the microprism array 381 as a retro-reflector on the lower surface of the reflector 380. According to a characteristic of the retro-reflector, light entered the microprism array 381 may be reflected with the same exit angle as an incident angle. The light source 111 according to an embodiment of the disclosure may reflect light entered the reflector 380 from the light emitting diode 190 via the quantum dot cover 160 to the lower reflector 113 by including the microprism array 381 on the lower surface of the reflector 380. As described above, light reflected to the lower reflector 113 may be again reflected forward by the lower reflector 113 and accordingly, the light source 111 may obtain an optical profile of a great beam angle.

Figure 16:
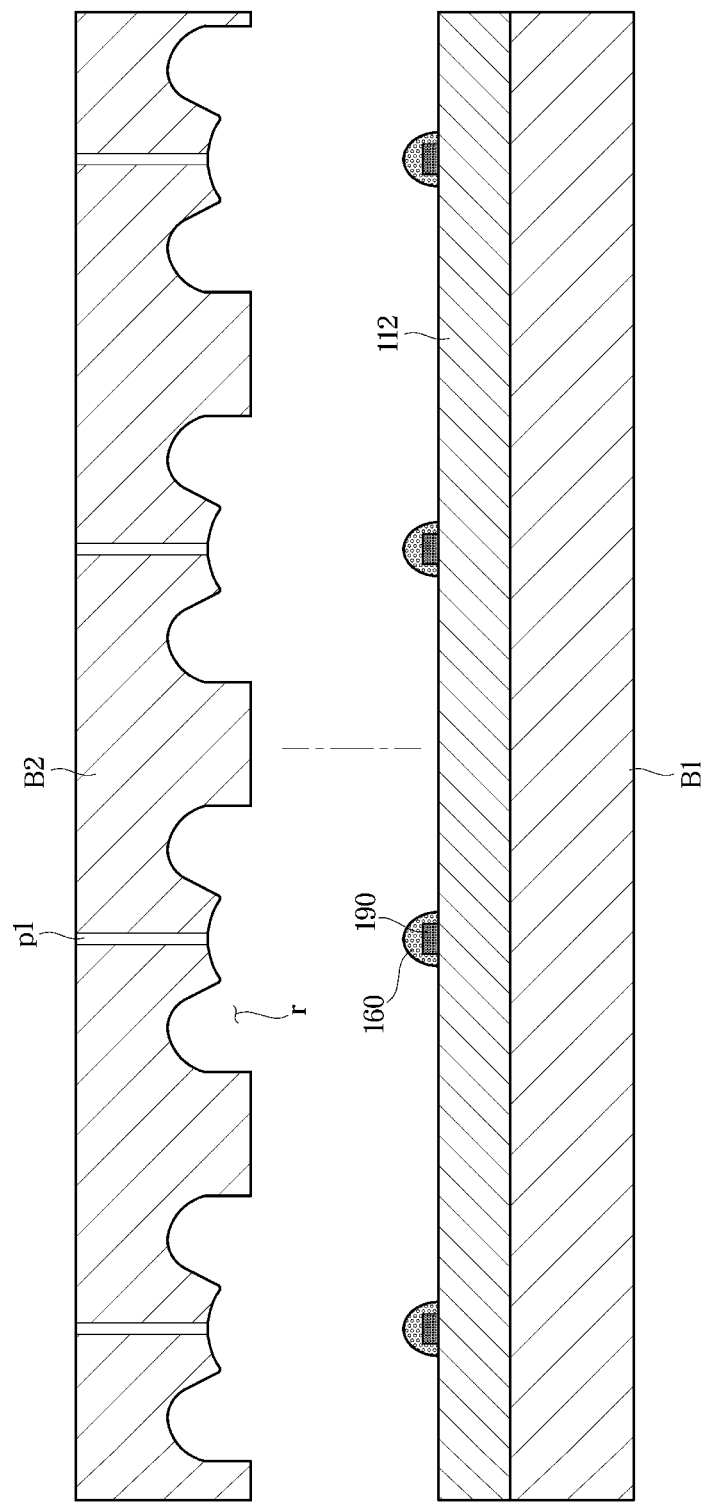
FIG. 16 shows an example of a method for manufacturing a light source of a backlight unit according to an embodiment of the disclosure.

FIG. 16 schematically shows an example of a method for manufacturing a light source of a backlight unit according to an embodiment of the disclosure. Hereinafter, an example of a method for manufacturing a backlight unit according to an embodiment of the disclosure will be described with reference to FIG. 16. In FIG. 16, the light source 111 according to an embodiment of the disclosure may be manufactured by an injection molding process.

More specifically, the light emitting diode 190 may be mounted on the substrate 112 by the COB method, an upper mold B may be positioned on the quantum dot cover 160 dispensed and hardened to cover the light emitting diode 190, and a lower mold B1 may be positioned below the substrate 112.

The upper mold B2 may include a preset groove r for defining a shape of the refractive cover 170. The preset groove r may correspond to a location of the light emitting diode 190 and the quantum dot cover 160.

According to an embodiment of the disclosure, the substrate 112, the light emitting diode 190, and the quantum dot cover 160 may be positioned on the lower mold B1, the upper mold B2 may move toward the lower mold B1 to close a cavity, and then, a liquid transparent material for forming the refractive cover 170 may be injected through a flow path p1 connected with the groove r. The transparent material injected into the groove r through the flow path p1 may be hardened to form the refractive cover 170. By the process, the refractive cover 170 may be formed on the substrate 112 to directly cover the quantum dot cover 160, without being subject to a process of bonding the refractive cover 170 onto the substrate 112.

According to an embodiment of the disclosure, the reflector 180 may be formed by forming the refractive cover 170 on the substrate 112 through the above-described injection molding process without a bonding operation, dispensing a liquid reflective material on the refractive cover 170, and then hardening the liquid reflective material. The liquid reflective material may include, for example, silicon dioxide (SiO$_2$) or silver (Ag). However, the reflector 180 may be formed by a double injection method, together with the refractive cover 170.

Figure 17:
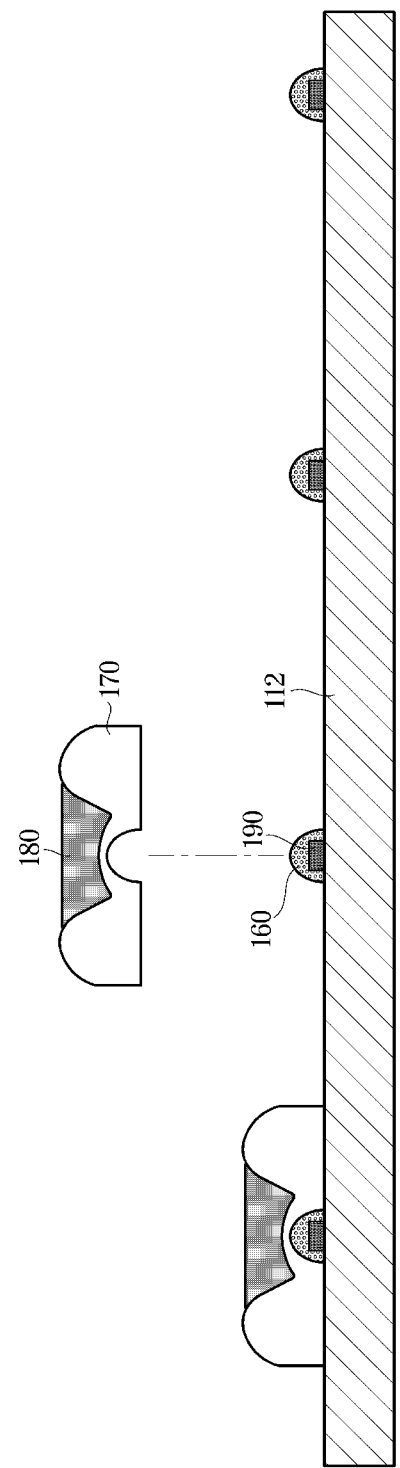
FIG. 17 shows another example of a method for manufacturing a light source of a backlight unit according to an embodiment of the disclosure.

FIG. 17 schematically shows another example of a method for manufacturing a light source of a backlight unit according to an embodiment of the disclosure. In FIG. 17, the light source 111 may be formed by mounting the light emitting diode 190 on the substrate 112 by the COB method, dispensing and hardening a liquid quantum dot resin to form the refractive cover 170, and bonding the refractive cover 170 and the reflector 180 manufactured separately on the substrate 112.

That is, the light source 111 may be manufactured by manufacturing a plurality of refractive covers 170 and a plurality of reflectors 180 separately and bonding the refractive covers 170 and the reflectors 180 on the substrate 112 to respectively correspond to the plurality of light emitting diodes 190 and the plurality of quantum dot covers 160.

The refractive cover 170 and the reflector 180 may be manufactured by various methods. For example, the refractive cover 170 and the reflector 180 may be manufactured by a single process through a double injection method, or by first manufacturing a refractive cover through injection molding and then dispensing and hardening a liquid reflective material.

Figure 19:
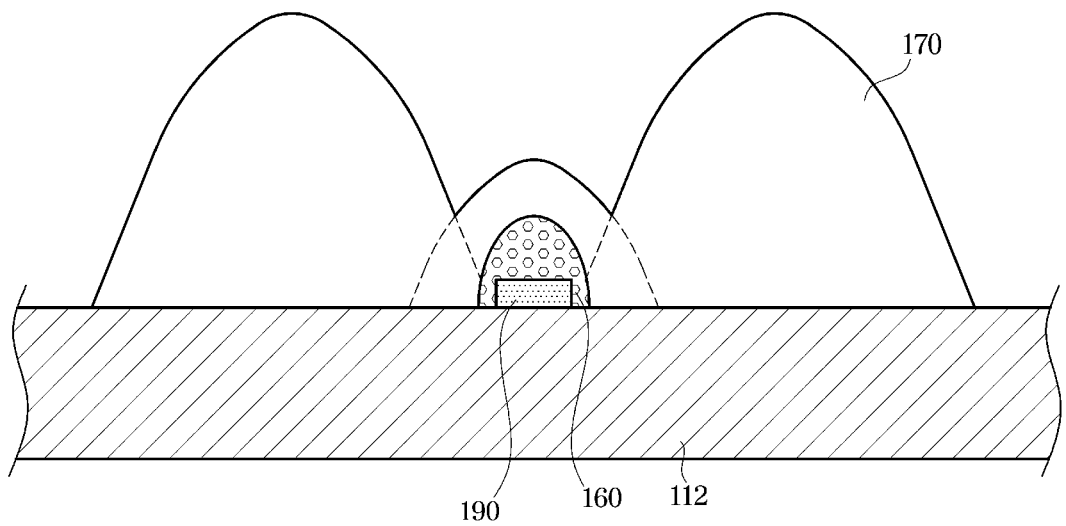
FIG. 19 shows a method for forming a refractive cover in a method for manufacturing a light source of a backlight unit according to an embodiment of the disclosure.
Figure 20:
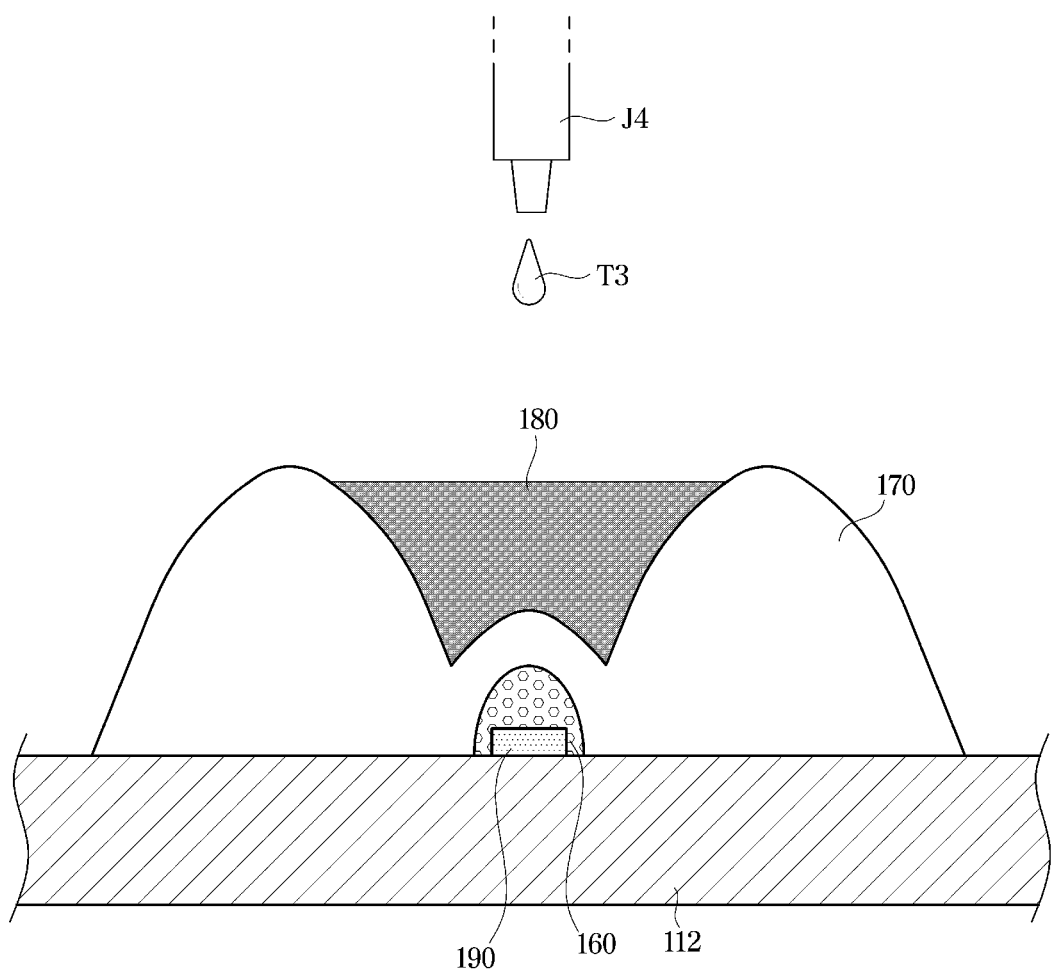
FIG. 20 shows a method for forming a reflector in a method for manufacturing a light source of a backlight unit according to an embodiment of the disclosure.

FIG. 18 schematically shows a method for forming a quantum dot cover in a method for manufacturing a light source of a backlight unit according to an embodiment of the disclosure. FIG. 19 schematically shows a method for forming a refractive cover in a method for manufacturing a light source of a backlight unit according to an embodiment of the disclosure. FIG. 20 schematically shows a method for forming a reflector in a method for manufacturing a light source of a backlight unit according to an embodiment of the disclosure.

A method for manufacturing the light source 111 according to an embodiment of the disclosure will be described with reference to FIGS. 18 to 20. In FIG. 18, the light emitting diode 190 may be mounted on the substrate 112 by the COB method, and then, a liquid quantum dot resin T1 may be dispensed through a first dispenser J1 to cover the light emitting diode 190. The first dispenser J1 may be positioned above the light emitting diode 190 to dispense the quantum dot resin T1 on the light emitting diode 190. The quantum dot resin T1 may be dispensed in a liquid state and then hardened to form the quantum dot cover 160.

In FIG. 19, each of a second dispenser J2 and a plurality of third dispensers J3 may dispense a liquid transparent material T2. The third dispensers J3 may be spaced a preset distance from the second dispenser J2 in the horizontal direction. The second dispenser J2 may be positioned between the plurality of third dispensers J3.

Each of the second dispenser J2 and the plurality of third dispensers J3 may dispense the liquid transparent material T2, and the liquid transparent material dispensed by the second dispenser J2 and the plurality of third dispensers J3 may be hardened to form the refractive cover 170.

A shape of the refractive cover 170 may be defined according to an amount of the transparent material T2 dispensed by each of the second dispenser J2 and the plurality of third dispensers J3, the distance between the second dispenser J2 and the plurality of third dispensers J3, and thixotropic of the transparent material T2.

In FIG. 20, a fourth dispenser J4 may dispense a liquid reflective material T3 in the recessed portion formed in the center portion of the refractive cover 170, and then the dispensed reflective material may be hardened to form the reflector 180.

As shown in FIGS. 18 to 20, the quantum dot cover 160, the refractive cover 170, and the reflector 180 may be formed on the substrate 112 only by a dispensing or jetting process, instead of injection molding.

According to the disclosure, a display apparatus including a backlight unit having high productivity and low manufacturing cost may be provided. According to the disclosure, a display apparatus including a backlight unit capable of reducing production cost by reducing an amount of use of a quantum dot resin may be provided. According to the disclosure, a display apparatus including a light source having an optical profile of a great beam angle may be provided.

Although specific embodiments have been shown and described, the disclosure is not limited to the above-described embodiments, and various modifications can be made by those skilled in the art without departing from the gist of the technical idea of the disclosure defined by the claims below.

What is claimed is:

1. A display apparatus comprising:
    a liquid crystal panel; and
    a backlight unit configured to provide light to the liquid crystal panel,
    wherein the backlight unit comprises:
        a substrate;
        a light emitting diode provided on the substrate;
        a quantum dot cover covering the light emitting diode and configured to convert a wavelength of light emitted from the light emitting diode;
        a refractive cover covering the quantum dot cover, wherein a surface of the refractive cover has a recessed portion that is recessed toward the quantum dot cover; and
        a reflector provided in the recessed portion to be positioned above the quantum dot cover,
    wherein a diameter of a lower surface of the reflector is smaller than a diameter of an upper surface of the reflector,
    wherein the lower surface of the reflector is upwardly convex such that the light emitted from the light emitting diode with an angle higher than an upper limit of a beam angle profile of the light is reflected from the lower surface of the reflector, and the light reflected from the lower surface of the reflector is reflected again by a lower reflector, and
    wherein the beam angle profile of the light is changed in accordance with a change of a linear distance between a center portion of the lower surface of the reflector and a center portion of an upper surface of the quantum dot cover.

2. The display apparatus of claim 1, wherein the refractive cover has a maximum height at a point spaced from a center of the light emitting diode by a certain distance in a horizontal direction.

3. The display apparatus of claim 2, wherein the refractive cover is upwardly convex at the maximum height.

4. The display apparatus of claim 2, wherein the refractive cover is rotationally symmetric.

5. The display apparatus of claim 1, wherein the diameter of the lower surface of the reflector is greater than a diameter of a lower surface of the quantum dot cover.

6. The display apparatus of claim 1, further comprising a glass beads array provided on the lower surface of the reflector or a microprism array provided on the lower surface of the reflector.

7. The display apparatus of claim 1, wherein the backlight unit further comprises a lower reflector provided on the substrate and comprising a photo solder resist (PSR).

8. The display apparatus of claim 7, wherein a horizontal distance from a center of the light emitting diode to an outermost point of the reflector to which a marginal ray passing through the refractive cover is tangent is Lr, a vertical distance from the outermost point of the reflector to the lower reflector is H, and $10° < \tan^{-1}(H/Lr) < 70°$.

9. The display apparatus of claim 1, wherein the light emitting diode is mounted on the substrate by a Chip On Board (COB) method.

10. The display apparatus of claim 1, wherein the light emitting diode is further configured to emit blue light.

11. The display apparatus of claim 10, wherein the quantum dot cover is further configured to convert a portion of the blue light emitted from the light emitting diode into red light and green light.

12. The display apparatus of claim 1, wherein the quantum dot cover is formed by dispensing a liquid quantum dot resin and hardening the dispensed liquid quantum dot resin.

13. The display apparatus of claim 1, wherein the refractive cover is formed by dispensing a liquid transparent material and hardening the dispensed liquid transparent material.

14. The display apparatus of claim 1, wherein the reflector is formed by dispensing a liquid reflective material and hardening the dispensed liquid reflective material.

15. A display apparatus comprising:
    a substrate;
    a light emitting diode provided on the substrate;
    a quantum dot cover covering the light emitting diode and configured to convert a wavelength of light emitted from the light emitting diode;
    a refractive cover covering the quantum dot cover and having a recessed portion that is recessed toward the quantum dot cover, a lower surface of the recessed portion having a contour that is substantially similar to a contour of the quantum dot cover; and
    a reflector provided in the recessed portion positioned above the quantum dot cover,
    wherein a diameter of a lower surface of the reflector is smaller than a diameter of an upper surface of the reflector,
    wherein the lower surface of the reflector is upwardly convex such that the light emitted from the light emitting diode with an angle higher than an upper limit of a beam angle profile of the light is reflected from the lower surface of the reflector, and the light reflected from the lower surface of the reflector is reflected again by a lower reflector, and
    wherein the beam angle profile of the light is changed in accordance with a change of a linear distance between a center portion of the lower surface of the reflector and a center portion of an upper surface of the quantum dot cover.

16. A display apparatus comprising:
    a liquid crystal panel; and
    a backlight unit configured to provide light to the liquid crystal panel,
    wherein the backlight unit comprises:
        a substrate;
        a light emitting diode provided on the substrate;
        a quantum dot cover covering the light emitting diode and configured to convert a wavelength of light emitted from the light emitting diode;
        a refractive cover covering the quantum dot cover, wherein a surface of the refractive cover has a recessed portion that is recessed toward the quantum dot cover; and
        a reflector provided in the recessed portion to be positioned above the quantum dot cover,
    wherein a diameter of a lower surface of the reflector is smaller than a diameter of an upper surface of the reflector, and wherein the display apparatus further comprises a glass beads array provided on the lower surface of the reflector or a microprism array provided on the lower surface of the reflector.

* * * * *